United States Patent
Acharya et al.

(10) Patent No.: US 10,158,534 B2
(45) Date of Patent: Dec. 18, 2018

(54) EDGE PROCESSING FOR DATA TRANSMISSION

(71) Applicant: Hitachi, Ltd., Tokyo (JP)

(72) Inventors: Joydeep Acharya, Sunnyvale, CA (US); Sudhanshu Gaur, Santa Clara, CA (US)

(73) Assignee: Hitachi, Ltd., Tokyo (JP)

( * ) Notice: Subject to any disclaimer, the term of this patent is extended or adjusted under 35 U.S.C. 154(b) by 244 days.

(21) Appl. No.: 15/201,661

(22) Filed: Jul. 5, 2016

(65) Prior Publication Data

US 2018/0013635 A1     Jan. 11, 2018

(51) Int. Cl.

| | |
|---|---|
| H04L 12/24 | (2006.01) |
| H04L 12/26 | (2006.01) |
| H04L 29/08 | (2006.01) |
| H04W 24/04 | (2009.01) |
| H04W 4/029 | (2018.01) |
| H04W 4/02 | (2018.01) |

(52) U.S. Cl.
CPC ........ *H04L 41/147* (2013.01); *H04L 43/0829* (2013.01); *H04L 43/0852* (2013.01); *H04L 67/303* (2013.01); *H04W 4/029* (2018.02); *H04W 24/04* (2013.01); *H04W 4/02* (2013.01)

(58) Field of Classification Search
CPC ....... H04L 12/26; H04L 29/08; H04L 41/147; H04L 43/0829; H04L 67/303; H04L 43/0852; H04L 12/24; H04W 4/02; H04W 4/029; H04W 24/04
See application file for complete search history.

(56) References Cited

U.S. PATENT DOCUMENTS

| | | | |
|---|---|---|---|
| 2004/0143428 A1* | 7/2004 | Rappaport | G06F 17/509 703/22 |
| 2012/0172672 A1 | 7/2012 | Pekarske et al. | |
| 2013/0010610 A1* | 1/2013 | Karthikeyan | H04L 41/069 370/242 |

(Continued)

FOREIGN PATENT DOCUMENTS

EP     2 555 569 A1     2/2013

OTHER PUBLICATIONS

Extended European Search Report received in corresponding European Application No. 17179311.0 dated Nov. 23, 2017.

(Continued)

*Primary Examiner* — Charles C Jiang
*Assistant Examiner* — Kyaw Z Soe
(74) *Attorney, Agent, or Firm* — Mattingly & Malur, PC

(57) ABSTRACT

In some examples, a computing device may determine a prediction of a network outage of a network. The computing device may determine a priority of one or more data types expected to be received during the network outage. Further, the computing device may determine a latency category of the one or more data types expected to be received during the network outage. The computing device may store a data transmission rule for the one or more data types at least partially based on the priority and the latency category. The computing device may receive, from one or more data generators, during the network outage, data for transmission to the network. The computing device may transmit at least some of the received data to the network at least partially based on the data transmission rule.

18 Claims, 16 Drawing Sheets

(56) References Cited

U.S. PATENT DOCUMENTS

2013/0035083 A1* 2/2013 Kadel ................. H04W 84/005
                                                                455/418
2016/0371014 A1* 12/2016 Roberts ................. G06F 3/0611
2017/0318479 A1* 11/2017 Cotanis ................. H04W 24/02

OTHER PUBLICATIONS

"Fog Computing and the Internet of Things: extend the Cloud to Where the Things Are", Cisco 2015, pp. 1-6., www.cisco.com/go/iot.

* cited by examiner

EDGE PROCESSING FOR DATA TRANSMISSION

BACKGROUND

Some types of devices may periodically transmit data to cloud computing devices or other network computing devices located over a network from the transmitting device. With the advent of the Internet of Things (IoT), traditional models of data transmission to network computing devices may be insufficient. In particular, millions of IoT devices may generate data that together may have a significantly larger volume, velocity, and variety than the data generated by traditional applications and devices. For instance, if all this data is attempted to be transmitted over a network to one or more network computing devices for centralized processing, an underlying application and/or network may suffer latency, errors, or the like.

Conventional solutions may include a controller configured to provide individualized control of a payload in each data packet, as described, e.g., in US Patent Application Publication No. US 2012/0172672, to Pekarske et al., filed Dec. 29, 2010, which is incorporated herein by reference. However, in the domain of mobile and cellular communications, the network connection may sometimes be unreliable, which may lead to packet losses, delays in transmission, and so forth, which may compound the complexity of transmitting data to the network computing device.

SUMMARY

Some implementations include arrangements and techniques for managing the transmission of data over a network according to characteristics of the network and characteristics of the data to be transmitted. For example, a computing device may predict that a network outage expected to occur, such as in the near future. The computing device may determine a priority associated with one or more data types expected to be received during the network outage. Further, the computing device may determine a latency category of the one or more data types expected to be received during the network outage. The computing device may store a data transmission rule for the one or more data types at least partially based on the respective priority and latency category. Before or during the network outage, the computing device may receive, from one or more data generators, data for transmission to the network. When the network becomes available, the computing device may transmit at least some of the received data to the network at least partially based on the data transmission rule.

In some examples, a computing device may determine, based on historical network condition information and an indication of a current geolocation of the computing device, a prediction of an outage of a network. Further, the computing device may receive first data from a first sensor and second data from a second sensor before and/or during the network outage. Following an end of the outage, the computing device may transmit at least a portion of the first data based on a first priority and a first latency category associated with the first data, and transmit at least a portion of the second data based on a second priority and a second latency category associated with the second data.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Some implementations herein are directed to techniques and arrangements for edge processing of data that includes managing data transmissions according to characteristics of a transmission network and characteristics of the data to be transmitted. For instance, the data transmission techniques herein may include localized decision making on the generated data to reduce the volume, velocity, and variety of the data, and to transmit the data over a network to one or more network computing devices, which may also be referred to as cloud computing devices in some examples. Thus, examples herein may enable distributed decision making for filtering and/or compressing data that is sent to a network computing device.

In some implementations, prior to transmission, a computing device may reduce the resolution of the data (i.e., compress the data) at the application level based on a current indicated signal quality of a wireless network and/or a predicted signal quality of the wireless network. For instance, based on a current location of the computing device, historical signal qualities and other historical network conditions, a signal quality database, or the like, the computing device may predict the signal quality of the wireless network in the near future. The computing device may utilize the predicted future values of the signal quality of the wireless network over one or more upcoming time intervals, and may perform resource allocation and compression of received IoT data to determine data to transmit during a current time interval and data to transmit during future time intervals.

For discussion purposes, some example implementations are described in the environment of a computing device that sends data over a wireless network, and that may be mobile in some cases. However, implementations herein are not limited to the particular examples provided, and may be extended to other types of computing devices, other types of data, other types of environments, other system architectures, and so forth, as will be apparent to those of skill in the art in light of the disclosure herein.

Figure 1:
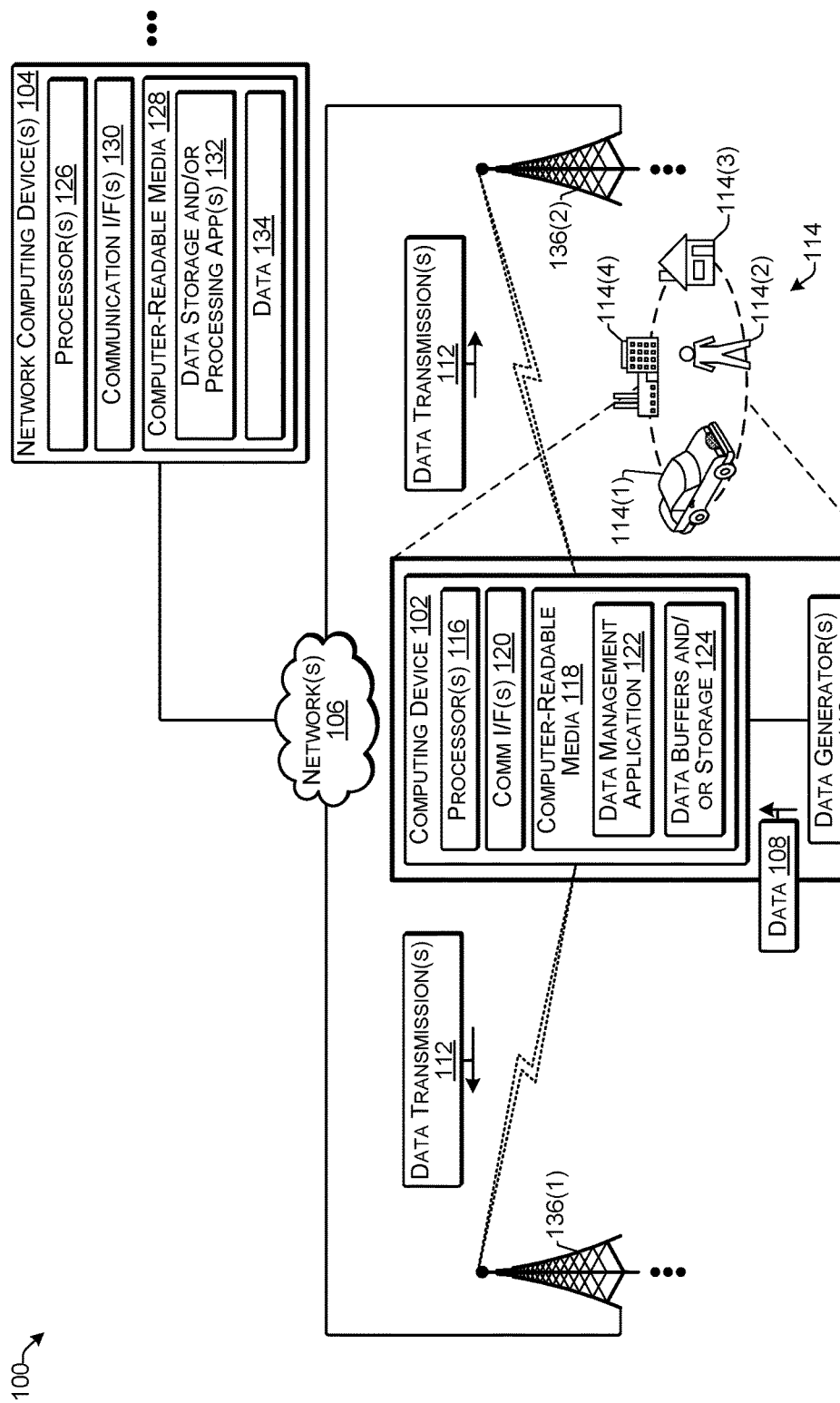
FIG. 1 illustrates an example architecture of a system according to some implementations.

FIG. 1 illustrates an example architecture of a system 100 according to some implementations. The system 100 includes at least one computing device 102 that is able to communicate with at least one network computing device 104, such as through one or more networks 106. The computing device 102 may be any of a variety of computing devices such as a desktop, workstation, server, laptop, tablet computing device, mobile device, smart phone, cellphone, wearable computing device, vehicle electronic control unit (ECU), embedded computing device, or any other type of computing device able to send data over a network.

In some cases, the computing device 102 may receive IoT data 108 from one or more data generators 110 and may forward at least a portion of the data 108 over the network 106 as one or more data transmissions 112. For instance, the data generators 110 may be any type of IoT device, including various types of sensors, such as cameras, microphones, Global Positioning System (GPS) devices, body condition sensors, vehicle sensors, sensors for other types of machines, sensors for people, animals, local conditions, and so forth. Further, other types of data may be included in the data 108 in addition to sensor data, such as other types of data generated by the data generators 110 and/or data generated by the computing device 102.

The computing device 102 may reside in any of a variety of environments 114. As one example, the computing device 102 may be embedded in, or otherwise included in a vehicle 114(1), such as an automobile, truck, train, boat, airplane, drone, motorcycle, or the like. For instance, the data generators 110 may provide information about the vehicle that is transmitted to the network computing device 104, such as position information, speed information, mechanical condition information, fuel information, driver information, autonomous navigation information, and so forth.

As another example, an environment of the computing device 102 may include the computing device 102 being worn or otherwise carried by a person 114(2), and the computing device 102 may include a portable computing device, such as a smart phone, cellphone, wearable computing device, fitness tracker, or other mobile device. For instance, suppose that the data generators 110 include a body condition sensor, such as a heartrate monitor, blood sugar monitor, fitness tracking sensors, or the like. In some examples, the person 114(2) may carry the computing device 102 while in motion, such as walking, running, or traveling by vehicle.

As other examples, the environment of the computing device 102 may be a home 114(3), a place of business 114(4), or any other stationary location. Further, in some examples, the computing device 102 and the data generator(s) 110 may be integrated, such as in the case of a connected thermostat, alarm system, appliance, or the like, that includes communication and data processing capabilities. Numerous other variations will be apparent to those of skill in the art having the benefit of the disclosure herein.

The computing device 102 may include at least one processor 116, one or more computer-readable media 118, and one or more communication interfaces (I/Fs) 120. Each processor 116 may be a single processing unit or a number of processing units, and may include single or multiple computing units, or multiple processing cores. The processor(s) 116 can be implemented as one or more central processing units, microprocessors, microcomputers, microcontrollers, digital signal processors, state machines, logic circuitries, and/or any devices that manipulate signals based on operational instructions. For instance, the processor(s) 116 may be one or more hardware processors and/or logic circuits of any suitable type specifically programmed or configured to execute the algorithms and processes described herein. The processor(s) 116 may be configured to fetch and execute computer-readable instructions stored in the computer-readable media 118, which can program the processor(s) 116 to perform the functions described herein.

The computer-readable media 118 may include volatile and nonvolatile memory and/or removable and non-removable media implemented in any type of technology for storage of information such as computer-readable instructions, data structures, program modules, or other data. For example, the computer-readable media 118 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the network computing device 104, the computer-readable media 118 may be a tangible non-transitory medium to the extent that, when mentioned, non-transitory computer-readable media exclude media such as energy, carrier signals, electromagnetic waves, and/or signals per se. In some cases, the computer-readable media 118 may be at the same location as the computing device 102, while in other examples, the computer-readable media 118 may be partially remote from the computing device 102, such as accessible over the network 106.

The computer-readable media 118 may be used to store any number of functional components that are executable by the processor(s) 116. In many implementations, these functional components comprise instructions or programs that are executable by the processor(s) 116 and that, when executed, specifically program the processor(s) 116 to perform the actions attributed herein to the computing device 102. Functional components stored in the computer-readable media 118 may include a data management application 122. The data management application 122 may include one or more computer programs, computer-readable instructions, executable code, executable modules, or portions thereof that are executable to cause the processor(s) 116 to perform various tasks, such as for receiving data 108 and sending data transmissions 112 to the network computing device 104. Additionally, in some examples, the computing device 102 may include an operating system (not shown in FIG. 1) that may control and manage various functions of the computing device 102. In some cases, the functional components may be stored in a storage portion of the computer-readable media 118, loaded into a local memory portion of the computer-readable media 118, and executed by the one or more processors 116. Numerous other software and/or hardware configurations will be apparent to those of skill in the art having the benefit of the disclosure herein.

In addition, the computer-readable media 118 may store data and data structures used for performing the functions and services described herein. For example, the computer-readable media 118 may include a data buffer and/or data storage 124 for storing data 108 at least temporarily until a corresponding data transmission 112 is sent to the network computing device 104. The computing device 102 may also include or maintain other functional components, data, and data structures, which may include programs, drivers, etc., and other data used or generated by the functional components. Further, the computing device 102 may include many other logical, programmatic, and physical components, of which those described above are merely examples that are related to the discussion herein.

The communication interface(s) 120 may include one or more interfaces and hardware components for enabling communication with various other devices, such as over the one or more networks 106. Thus, the communication interfaces 120 may include, or may couple to, one or more ports that provide connection to the network(s) 106 for communicating with the network computing device 104. For example, the communication interface(s) 120 may enable communication through one or more of a LAN (local area network), WAN (wide area network), the Internet, cable networks, cellular networks, wireless networks (e.g., Wi-Fi) and wired networks (e.g., fiber optic, Ethernet, Fibre Channel), direct connections, as well as close-range communications such as BLUETOOTH®, ZIGBEE®, and the like, as additionally enumerated elsewhere herein. Further, in some cases the data generator(s) 110 may communicate with the computing device 102 through the communication interfaces 120, while in other cases, the data generator(s) 110 may be directly connected to or otherwise integrated with the computing device 102.

In some examples, the network computing device 104 may include one or more servers, personal computers, or other types of computing devices that may be embodied in any number of ways. For instance, in the case of a server, the modules, other functional components, and at least a portion of data storage may be implemented on at least one server, such as in a cluster of servers, a server farm or data center, a cloud-hosted computing service, and so forth, although other computer architectures may additionally or alternatively be used. In the illustrated example, the network computing device 104 includes, or may have associated therewith, one or more processors 126, one or more communication interfaces 130, and one or more computer-readable media 128.

Each processor 126 may be a single processing unit or a number of processing units, and may include single or multiple computing units, or multiple processing cores. The processor(s) 126 can be implemented as one or more central processing units, microprocessors, microcomputers, microcontrollers, digital signal processors, state machines, logic circuitries, and/or any devices that manipulate signals based on operational instructions. For instance, the processor(s) 126 may be one or more hardware processors and/or logic circuits of any suitable type specifically programmed or configured to execute the algorithms and processes described herein. The processor(s) 126 can be configured to fetch and execute computer-readable instructions stored in the computer-readable media 128, which can program the processor(s) 126 to perform the functions described herein.

The computer-readable media 128 may include volatile and nonvolatile memory and/or removable and non-removable media implemented in any type of technology for storage of information such as computer-readable instructions, data structures, program modules, or other data. For example, the computer-readable media 128 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that may be accessed by a computing device. Depending on the configuration of the network computing device 104, the computer-readable media 128 may be a tangible non-transitory medium to the extent that, when mentioned, non-transitory computer-readable media exclude media such as energy, carrier signals, electromagnetic waves, and/or signals per se. In some cases, the computer-readable media 128 may be at the same location as the network computing device 104, while in other examples, the computer-readable media 128 may be partially remote from the network computing device 104.

The computer-readable media 128 may be used to store any number of functional components that are executable by the processor(s) 126. In many implementations, these functional components comprise instructions or programs that are executable by the processor(s) 126 and that, when executed, specifically program the processor(s) 126 to perform the actions attributed herein to the network computing device 104. Functional components stored in the computer-readable media 128 may include a data storage and/or processing application 132. The data storage and/or processing application 132 may include one or more computer programs, computer-readable instructions, executable code, or portions thereof that are executable to cause the processor(s) 126 to perform various tasks, such as for receiving and processing data sent by the computing device 102. Additionally, an operating system (not shown in FIG. 1) may control and manage various functions of the network computing device 104. In some cases, the functional components may be stored in a storage portion of the computer-readable media 128, loaded into a local memory portion of the computer-readable media 128, and executed by the one or more processors 126. Numerous other software and/or hardware configurations will be apparent to those of skill in the art having the benefit of the disclosure herein.

In addition, the computer-readable media 128 may store data and data structures used for performing the functions and services described herein. For example, the computer-readable media 128 may store data 134 received from the computing device 102 via the data transmissions 112. In some examples, the data 134 may be filtered, compressed, or otherwise modified as compared to the data 108. The network computing device 104 may also include or maintain other functional components and data, which may include programs, drivers, etc., and other data used or generated by the functional components. Further, the network computing device 104 may include many other logical, programmatic, and physical components, of which those described above are merely examples that are related to the discussion herein.

The communication interface(s) 130 may include one or more interfaces and hardware components for enabling communication with various other devices, such as over the one or more networks 106. Thus, the communication interfaces 130 may include, or may couple to, one or more ports that provide connection to the network(s) 106 for communicating with the computing device 102. For example, the communication interface(s) 130 may enable communication through one or more of a LAN (local area network), WAN (wide area network), the Internet, cable networks, cellular networks, wireless networks (e.g., Wi-Fi) and wired networks (e.g., fiber optic, Ethernet, Fibre Channel), direct connections, as well as close-range communications such as BLUETOOTH®, and the like, as additionally enumerated elsewhere herein.

The one or more networks 106 may include any type of network, including a local area network (LAN), such as an intranet; a wide area network (WAN), such as the Internet; a wireless network, such as a cellular network, a local wireless network, such as Wi-Fi, and/or short-range wireless communications, such as BLUETOOTH® or ZIGBEE®; a wired network including fiber optics, Ethernet, Fibre Channel, or any other such network, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. In the illustrated example, the networks 106 include a plurality of communication towers 136(1), 136(2), . . . , with which, in some cases, the computing device 102 may communicate when sending the data transmission(s) 112. For instance, the computing device may communicate wirelessly with the communication towers 136 for sending the data transmission(s) 112. Accordingly, the network computing device 104 and the computing device 102 are able to communicate over the one or more networks 106 using partially wired and partially wireless connections in some examples.

In the example of FIG. 1, the data management application 122 may be executed to send at least a portion of the data 108 to the network computing device 104 over the network 106. However, in some cases, the connection of the computing device 102 with the network 106 may not be stable or durable. For example, in the case that the computing device is moving, such as in a vehicle or by being carried by a person on foot or in vehicle, the computing device 102 may move in and out of range of communication towers 136, which may cause temporary loss of signal, interference, disruptions in service, or other outages. Accordingly, in some examples, the data management application 122 may predict and/or react to these outages, and may manage which portions of data 108 are sent to the network computing device 104, such as before, during, or after an outage.

In some cases, such as for typical IoT devices, much of the data 108 produced by the data generators 110 may have a deterministic pattern. For example, sensors may be programmed to report measurements at fixed intervals. Consequently, the periodicity and volume of data generation may be substantially known or predictable in advance of the data 108 being received by the computing device 102. This information about the data that is expected to be received can be used by the computing device 102 as part of a process for determining which data portions should be transmitted during which transmission opportunities. For instance, a deterministic or otherwise predictable pattern of data 108 may be used along with priority information and latency information about the data, and historic or otherwise predictable outage information about the network for determining which data portions to send during a current time interval, which data portions to save for sending during a future time interval, and which data portions may be discarded without sending.

Figure 2:
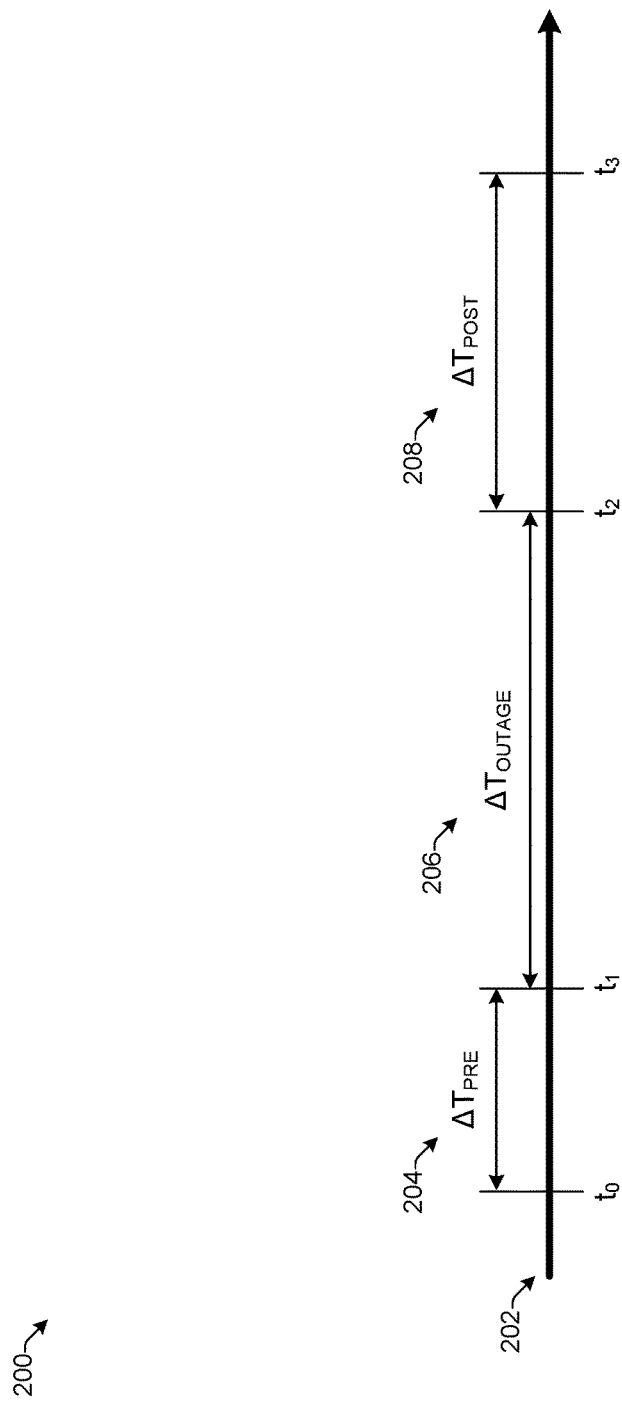
FIG. 2 illustrates an example timeline for data transmission according to some implementations.

FIG. 2 illustrates an example timeline 200 for data transmission according to some implementations. The example timeline 200 of FIG. 2 illustrates a high-level view of signal quality variations in a wireless network from time $t_0$ to time $t_3$. Thus, line 202 indicates the passage of time. In this case, $\Delta T_{PRE}$ indicates a time interval 204 before a network outage, and therefore, the network is available from the time periods $t_0$ to $t_1$. Additionally, $\Delta T_{OUTAGE}$ indicates a time interval 206 during a network outage from time $t_1$ to $t_2$. As one example, the outage may be caused by a cellular network in which the computing device 102 is in a location that does not have service, which may be highly congested, or the like. The rate and reliability with which data can be transmitted on the network depends at least partially on the network quality and availability. Further, $\Delta T_{POST}$ indicates a time interval 208 from $t_2$ to $t_3$ during which network service has been restored to an acceptable threshold level for reliably transmitting data.

Figure 3:
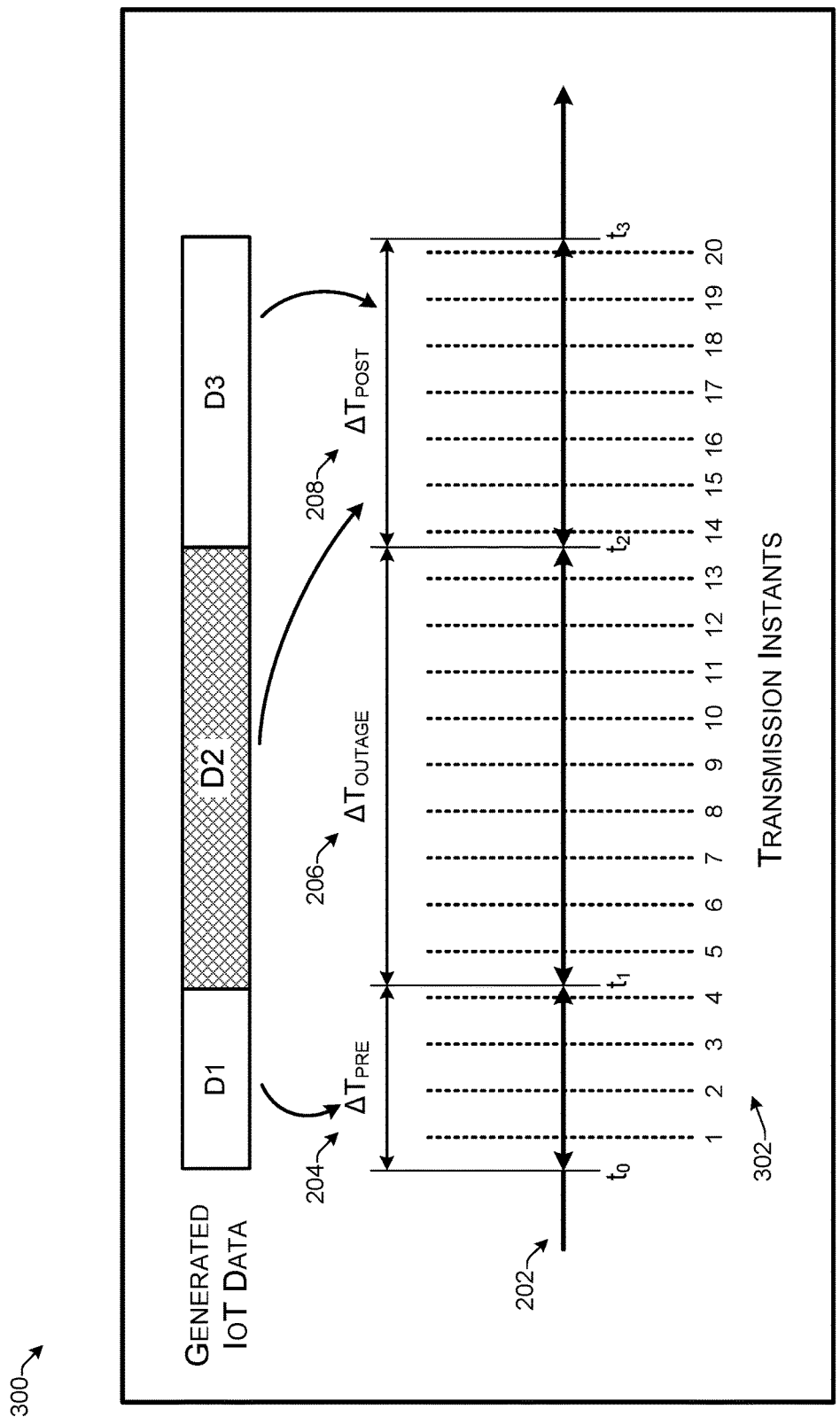
FIG. 3 illustrates an example of transmitting data in view of a network outage according to some implementations.

FIG. 3 illustrates an example 300 of transmitting data in view of a network outage according to some implementations. In this example, dashed lines 302 represent a plurality of transmission instants at which data is able to be transmitted over the network. As one example, each transmission instant 302 may correspond to a 1-millisecond subframe in the LTE (long-term evolution) wireless communication standard or other standard, and the transmission instants 302 may be referred to as transmission opportunities when coinciding with an available network. In this example, transmission instants 5-13 occur during the time interval 206 during which the network is not available for transmission or there may be excessive congestion making reliable transmission unviable. As mentioned above, this time interval is termed as $\Delta T_{OUTAGE}$ and because network service is unavailable and/or the network is unreliable, it would be undesirable to attempt to transmit data during this time.

Data D1 that is received during the first time interval 204 before the outage may be transmitted during any of the transmission instants 1-3. Furthermore, data D2 that is received during the second time interval 206 during the network outage may be saved in a buffer and may be transmitted during the third time interval 208 from time $t_2$ to $t_3$, i.e., during transmission opportunities 14-20, along with any new data D3 that is received during the third time interval 208. In addition, some portion of the data D1 that is received just prior to the outage time $t_1$, e.g., after the transmission opportunity 3, may also be buffered and transmitted after time $t_2$, i.e., during the third time interval 208 after the network service has been restored.

Figure 4:
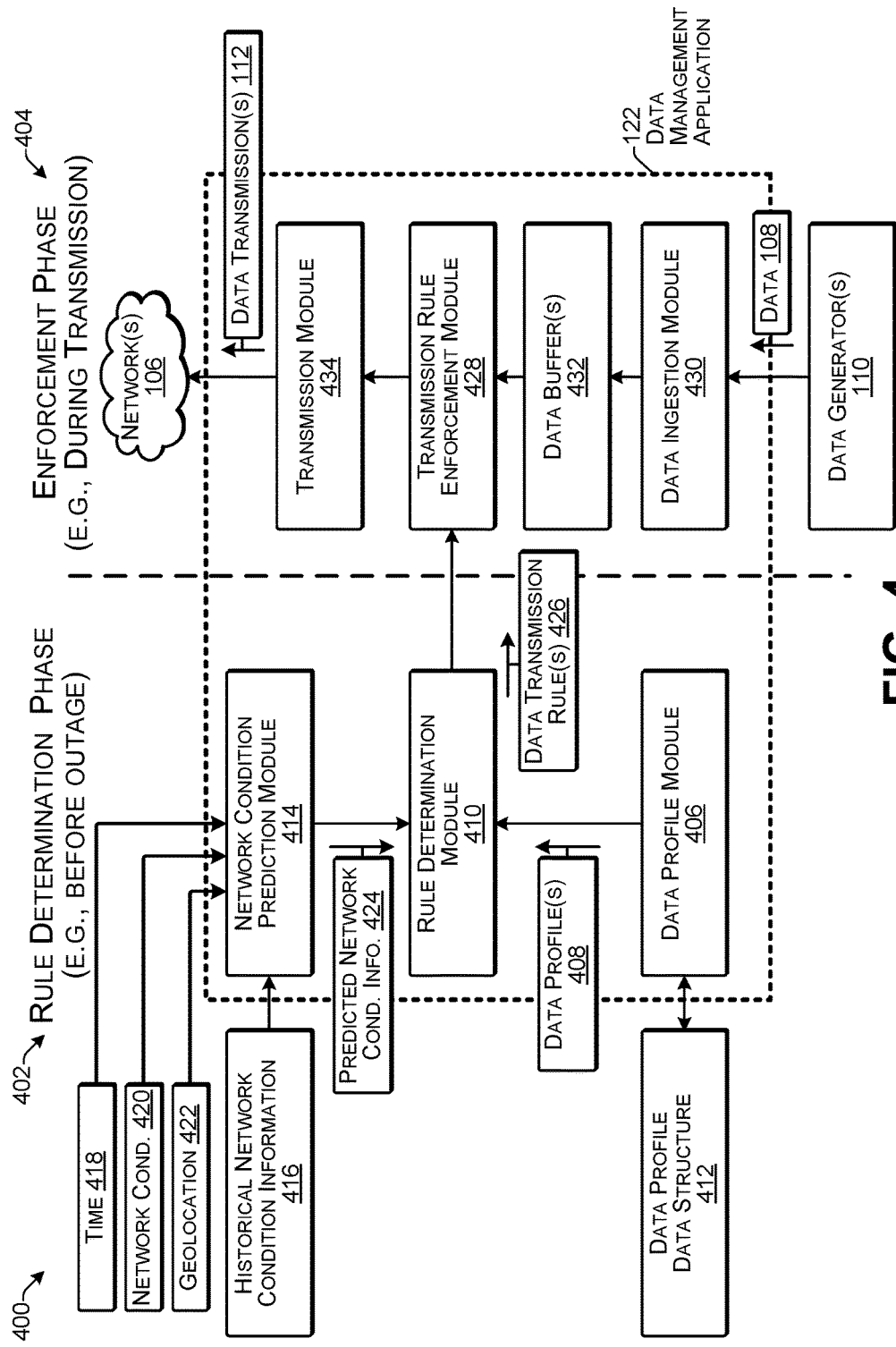
FIG. 4 illustrates an example of determining data transmission rules and enforcing the data transmission rules according to some implementations.

FIG. 4 illustrates an example 400 of determining transmission rules and enforcing the transmission rules according to some implementations. FIG. 4 illustrates an example data transmission according to some implementations and includes a pre-outage rule determination phase 402 and an enforcement phase 404 that takes place during and/or after the outage. The rule determination phase 402 may include derivation of one or more rules of resource allocation. For example, during this phase 402, the computing device 102 may determine which data samples or other data portions to transmit during which transmission opportunities during an upcoming time segment. Accordingly, the rule determination phase 402 may be performed prior to receiving some or all of the data 108 that will be transmitted to the network based on the determined rules.

In this example, a data profile module 406 inputs a data profile 408 for a selected data type received from a corresponding data generator to a rule determination module 410. For example, each IoT application, IoT device, or other data generator 110 may have a corresponding data profile 408 that may be retained in a data profile data structure 412. In some examples, the data profile module 406 may determine at least a portion of the data profile 408 for each data generator 110 based on observation of data 108 that is received from each respective type of data over time. Additionally, or alternatively, the data profile 408 for each data type, e.g., each data generator 110, may be set up initially at least in part by an administrator, or the like. An example of the data profile data structure 412 is described below with respect to FIG. 5.

In addition, a network condition prediction module 414 may predict transmission opportunities at least partially based on predicted intervals of poor network quality. As one example, the network condition prediction module 414 may take into account information from historical network condition information 416 that indicates how the network condition may vary with time of day and geolocation of the computing device. For instance, the network condition prediction module 414 may collect network information about network outages experienced by the computing device 102 over time and may store this information as the historical network condition information 416, such as in a database or the like. For instance, the collected historical network condition information 416 may include a geolocation at which an outage first occurred, a length of time of the outage, a geolocation at which service was restored, a route traveled by the computing device before, during, and after the outage, and the like. Additionally, or alternatively, the historical network condition information 416 may include information received from a service provider or other source indicating, e.g., geographic areas of poor single quality or other network outages, times of day during which networks are heavily congested or otherwise unavailable, or the like.

In addition, the network condition prediction module may receive additional information, such as a current time 418, such as time of day, day of the week, etc.; current network condition 420, such as a level of congestion, predicted level of congestion, and so forth; and geolocation information 422, such as a current and recent indicated geolocations, which may indicate a velocity at which the computing device is traveling, a direction in which the computing device is traveling, and so forth. The network condition prediction module 414 may employ some or all of this information and/or other information to determine predicted network condition information 424 that is provided to the rule determination module 410. The rule determination module 410 may receive the predicted network condition information 424 and the data profile(s) 408, as an input, and may determine which received data portions should be transmitted during which transmission opportunities, as discussed additionally below with respect to FIGS. 6 and 10. Thus, the rule determination module 410 may determine one or more data transmission rules 426 that are provided to a transmission rule enforcement module 428.

The enforcement phase 404 includes operations that are performed during and/or after the IoT data 108 is received from the data generator(s) 110 for transmission to the network 106. In particular, as the data 108 is received from the data generator(s) 110, the one or more data transmission rules 426 developed during the rule determination phase 402 are implemented on the received data 108 by the transmission rule enforcement module 428.

In the transmission enforcement phase 404, a data ingestion module 430 receives the data 108 from the data generator(s) 110. For instance, the data ingestion module 430 may be able to interface with sensors and/or other types of data generators 110 of many different varieties and transmission technologies such as through Ethernet, fiber optic, or other direct-wired connection, as well as through WiFi, BLUETOOTH®, ZIGBEE®, and so forth. The data ingestion module 430 may receive the data 108 and store the data 108 in one or more data buffers 432. For instance, there may be one buffer per data type, per IoT device, per data generator 110, or the like, such as depending on the types of data received by the computing device 102. For example, suppose that the computing device 102 is an embedded system in a vehicle, and the data generators 110 include a GPS device that provides GPS data, a speedometer that provides a current travel speed, a compass that provides a current heading of the vehicle, a fuel gauge that provides a current fuel level, and so forth. Each of these different types of data may be received periodically and retained in a separate buffer 432.

The transmission rule enforcement module 428 may use the data transmission rules 426 to select one or more data samples or other data portions from one or more of the buffers 432 for transmitting the selected data during an available transmission opportunity. For example, the transmission rule enforcement module 428 receives the one or more data transmission rules 426 from the rule determination module 410 and applies the one or more rules. For example, the transmission rule enforcement module 428 may select, based on the one or more data transmission rules 426, one or more portions of data from the data buffers 432 to transmit as a data transmission 112 to the network 106.

The transmission rule enforcement module 428 may provide the selected data to a transmission module 434 that transmits the selected data as the data transmission 112 to the network 106 using one or more transmission technologies. For example, the transmission module 434 may include transmission software that operates a hardware transceiver, such as an LTE transceiver in the case of cellular LTE, or any other type or other communication interface able to transmit to the network 106. The transmission module 434 may retrieve the selected data from one or more of the data buffers 432, may packetize the selected data, and may cause the communication interface to send the data packet(s) over the network 106. Accordingly, the transmission rule enforcement module 428 may select data to transmit to the network 106 based on the data transmission rules 426 and conditions of the network and/or the computing device 102, and may cause the transmission module 434 to transmit the selected data to the network 106 as a data transmission 112.

In some examples, as indicted by a dotted line, some or all of the modules 406, 410, 414, 428, 430 and 434 may be included in the data management application 122 discussed above with respect to FIG. 1. For instance, each module 406, 410, 414, 428, 430, and 434 may be a piece of executable code configured to cause a processor to perform the steps and algorithms discussed above. In other examples, some of these modules 406, 410, 414, 428, 430, and 434 may be executable separate from the management application 122. Additionally, in some examples, there may be more or fewer modules and/or some modules may be combined. Numerous other variations will be apparent to those of skill in the art having the benefit of the disclosure herein.

Figure 5:
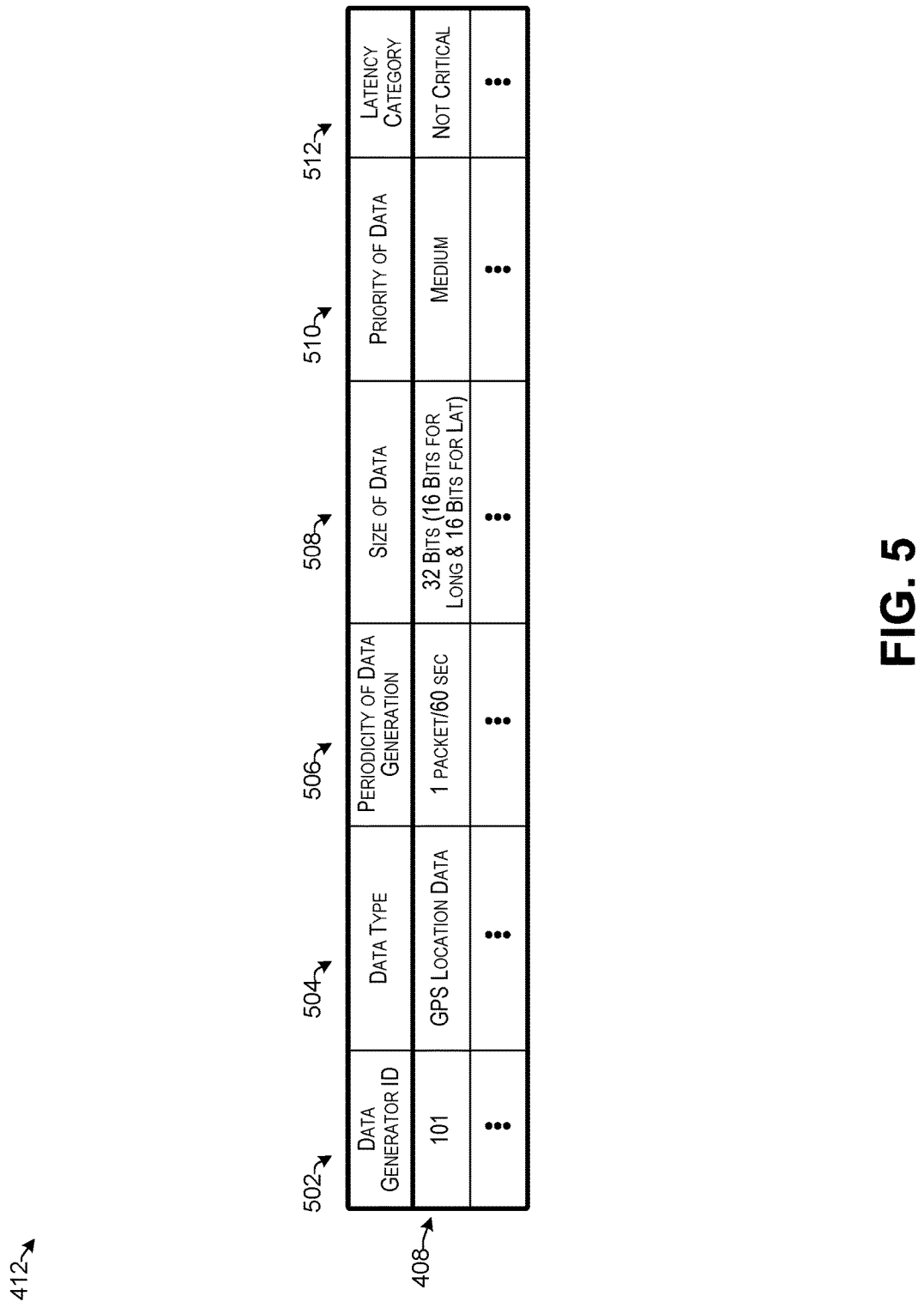
FIG. 5 illustrates an example data profile data structure according to some implementations.

FIG. 5 illustrates an example data profile data structure 412 according to some implementations. The data structure 412 may contain information about the data produced by each data generator 108 discussed above with respect to FIG. 1. Accordingly, the data structure 412 may include an application and/or device ID 502, which indicates an identifier of the corresponding data generator; a data type 504, which indicates the type of data produced by the data generator; a periodicity of data generation 506; which indicates how often the data is generated; a size of data 508, which indicates a size of the data that is generated for each time period specified at 506; a priority of the data 510, which indicates a priority of the data relative to other data generated by other data generators; and a latency category 512, which indicates the importance of transmitting the data within a threshold time of receipt of the data by the computing device 102. For example, for some types of data, it may not be necessary to transmit each data sample. Thus, in some examples, there may be at least two latency categories: critical, in which the data should be transmitted within a threshold time of receipt, and not critical, in which the data may be transmitted at a later time. Each row in the data structure 412 may indicate a separate data profile 408 for a separate data generator/data type, such as a separate application, sensing device, etc. In some examples, an administrator or other user may provide some or all of the information, such as the priority of the data 510 and the latency category 512 during an initial system setup or the like.

Figure 6:
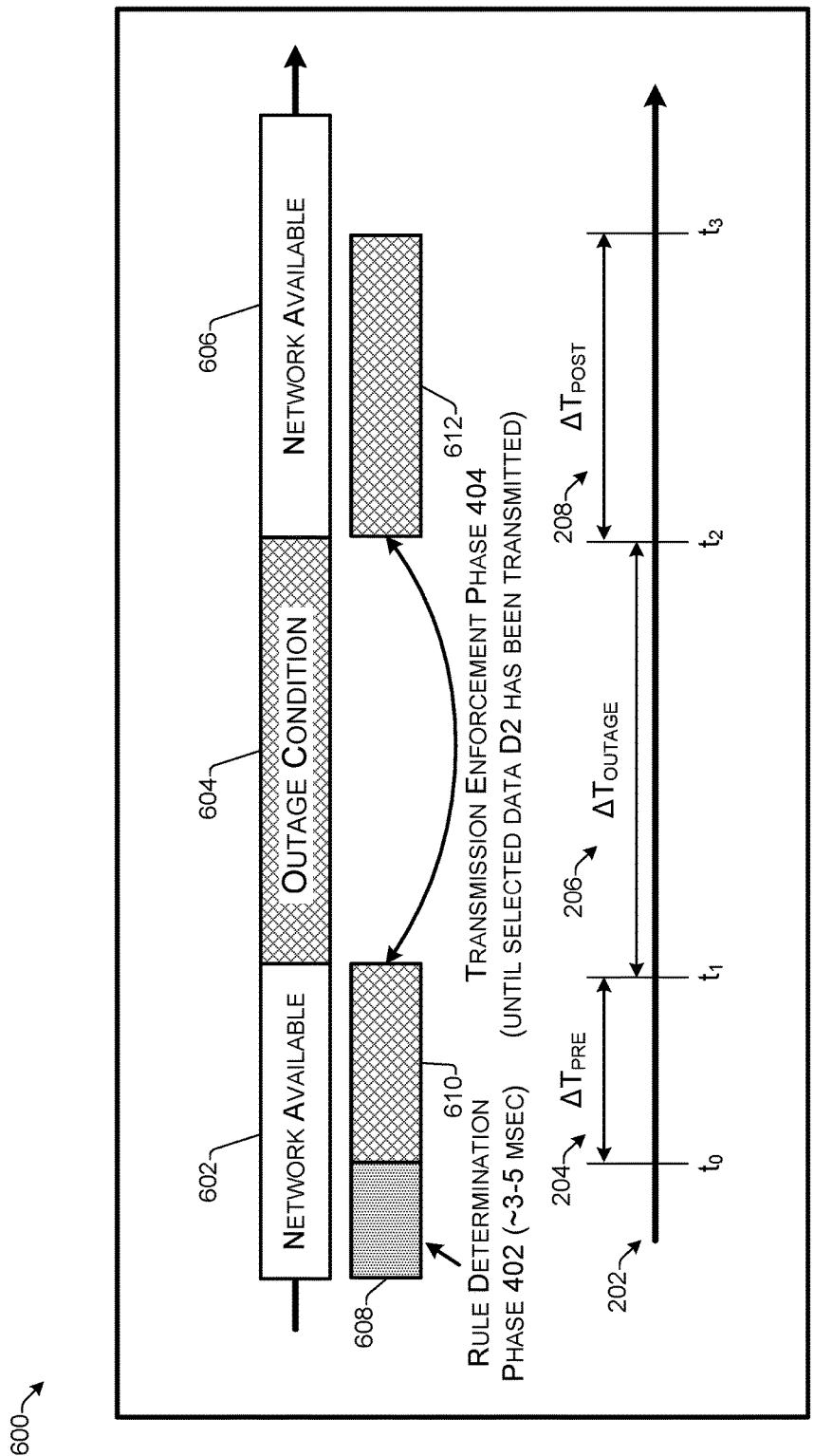
FIG. 6 illustrates an example timing of rule determination and enforcement according to some implementations.

FIG. 6 illustrates an example timing 600 of rule determination and enforcement according to some implementations. In this example, the network condition prediction module 414 may predict the condition of the network. For instance, "network available" may indicate that data can be transmitted. As an example, the size of the data that is able to be transmitted may be determined to be one of three categories, high, medium, or low, but not zero which would imply a network outage. Thus, an indication that the network is available may not necessarily indicate that the network condition is good, but rather that at least some data is able to be transmitted.

On the other hand, an "outage" may indicate that the amount of data able to be transmitted is below a threshold amount and may be zero in some cases. For example, an outage condition may be caused by network unavailability (e.g., no cellular coverage) or very high network congestion, which may make it not feasible to transmit data.

When the network condition prediction module 414 determines that an outage will occur in the near future, the rule determination phase 402 discussed above with respect to FIG. 4 may begin while the network is still in the available condition. The time at which the rule determination phase starts may depend at least partially on the typical time required for processing all the algorithms and functionalities of the rule determination phase 402. As one example, the rule determination phase 402 may begin at least 3-5 msec before the outage is predicted to occur. When the rule determination phase 402 has completed, the transmission enforcement phase 404 of FIG. 4 may begin, which may correspond to $\Delta T_{PRE} + \Delta T_{POST}$. The duration of the transmission enforcement phase 404 depends at least partially on the duration of $\Delta T_{POST}$, which may be chosen to be the amount of time needed for the data D2 (i.e., the data generated during the network outage—see, e.g., FIG. 3) to be completely transmitted.

In the illustrated example, 602 indicates a network condition during which the network is available, but an outage is predicted to occur; 604 indicates the outage; and 606 indicates that the network is available again. Suppose that the network condition prediction module 414 determines that the outage 604 will occur soon, e.g., within a matter of seconds, milliseconds, or the like. The network condition prediction module 414 may provide an indication of the predicted network condition to the rule determination module, as discussed above with respect to FIG. 4, before the outage occurs. The rule determination module may begin the rule determination phase at a point in time before the outage is predicted to occur. As indicated at 608, the rule determination phase may take approximately 3-5 msec, and then, as indicated at 610 and 612, the transmission enforcement phase 404 may take place. Accordingly, during time intervals 204, 206, and 208, the data transmission rules 426 determined by the rule determination module 410 may be enforced by the transmission rule enforcement module 428 of FIG. 4. For instance, the transmission enforcement phase 404 may continue from time $t_0$ to time $t_3$, i.e., until the data D2 received during the outage, and that is selected for transmission based on the data transmission rules, has been transmitted.

Figure 7:
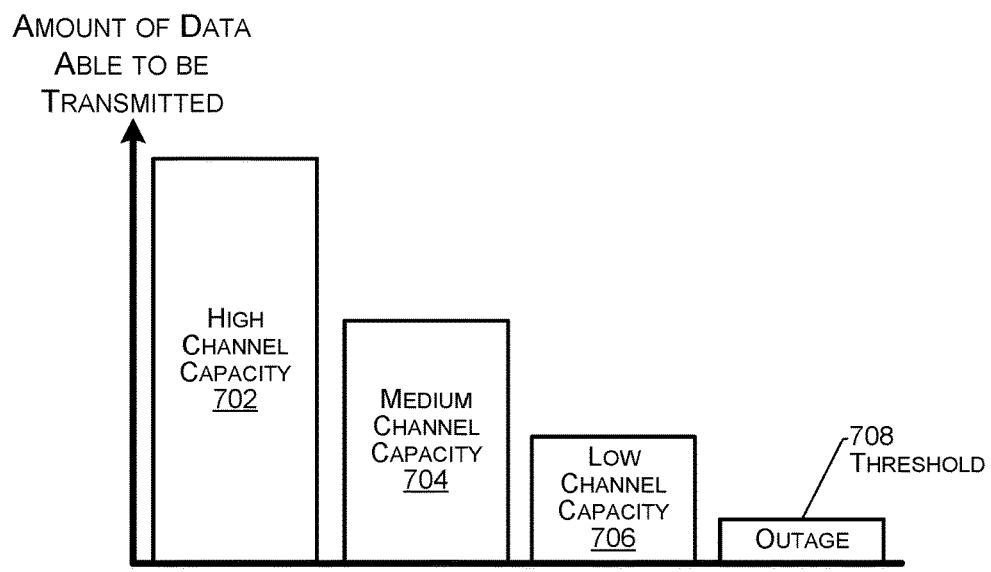
FIG. 7 illustrates an example of relative channel capacities according to some implementations.

FIG. 7 illustrates an example of relative channel capacities 700 according to some implementations. In the example of FIG. 6, when the network is categorized as "available", there is some channel capacity for transmitting some data. The categorization of "available" may indicate that one of high channel capacity 702, medium channel capacity 704, or low channel capacity 706 is the condition of the network. This does not necessarily indicate that the network/channel condition is good, but instead that the amount of data that can be transmitted reliably may be high, medium, or low, but not zero. On the other hand, when the network is categorized as "outage", the amount of data that may be transmitted is zero or otherwise below a threshold capacity, as indicated at 708, such that data is not able to transmitted reliably. An outage condition may be caused by either network unavailability, such as no cellular service, or very high network congestion, such that reliably transmitting data is not feasible.

Figure 8:
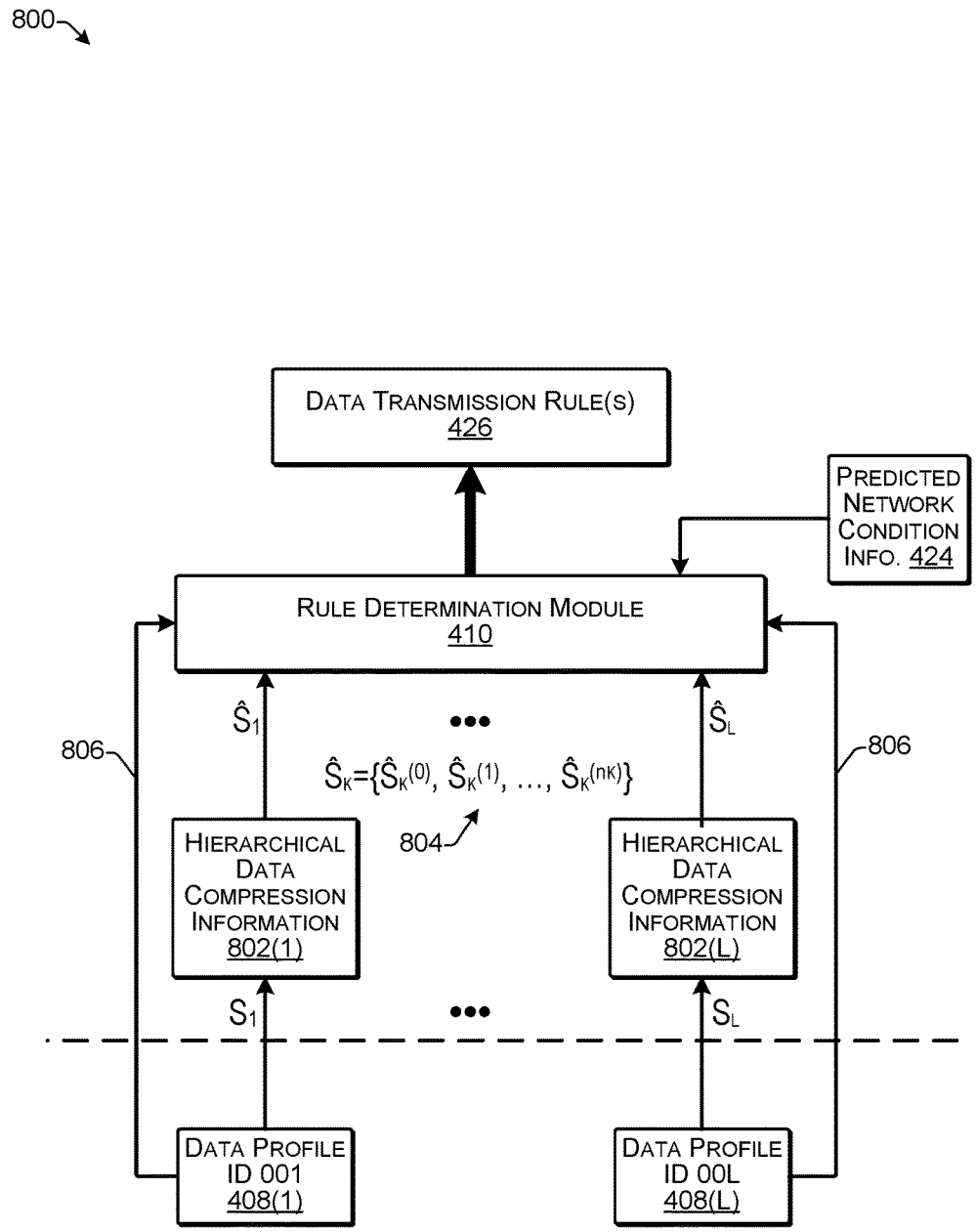
FIG. 8 illustrates an example of rule determination according to some implementations.

FIG. 8 illustrates an example 800 of rule determination including compression according to some implementations. In this example, the rule determination module 410 may receive one or more data profiles 408 from the data profile module 406 as discussed above with respect to FIG. 4. For instance, suppose that there are L types of data types provided by L data generators, and the respective data profiles 408(1)-408(L) are denoted by $S_1, \ldots, S_L$.

In some examples, the rule determination module 410 may determine hierarchical data compression information 802(1)-802(L) for each data type, such as for determining whether hierarchical data compression is recommended for that data type. Further, as part of the data compression information 802, the rule determination module 410 may list the different possible levels of compression that may be performed on a selected type of data. As one example, suppose that the data type is video content data received from a data generator that is a camera (e.g., the IoT sensor may be a video camera, such as for collecting a video surveillance feed, or the like). The video data may be encoded in various different resolutions corresponding to various different levels of compression, e.g., low definition, standard definition, or high definition video formats. In each case, the compression level is different, which may also cause a difference in the size of the data that is transmitted over the network.

The hierarchical data compression information 802 may include a listing of the compression details of each possible compression level for a given type of data. For instance, the compression details may include the level(s) of compression, the resulting payload, whether the compression is lossless or lossy, and the extent of data that will be lost in case of lossy compression. In examples herein, for a given data type "k" and associated data $S_k$, as indicated at 804, the vector $\hat{S}_k$, shows all possible compression levels, with nk being the number of compression levels. For example, nk=3 for, low definition, standard definition, and high definition resolutions for video, with the compression level of the raw video being 0, i.e., no compression.

The details of the hierarchical data compression information for the data profiles 408 may be applied by the rule determination module 410 when determining data transmission rules 426. For example, the rule determination module 410 may receive as input the hierarchical compression information 802(1)-802(L), the predicted network condition information 424 from the condition prediction module 414, as well as additional data profile information 806 from the data profiles 408, such as the data priority and latency category for each data type, as discussed above with respect to FIG. 5. The rule determination module 410 may perform resource allocation, which may include fitting all the IoT data to be transmitted into one or more transmission packets that can be reliably transmitted over the network during the next transmission opportunity. For instance, resource allocation may be used because the network condition may be variable and the resultant capacity of the network (e.g., the channel capacity), such as the size or amount of IoT data that can be reliably transmitted may vary from large (for good capacity) to small (for low capacity). Thus the resource allocation functionality of the rule determination module 410 determines how much of the received data (and at what compression level) is able to be fitted into a transmission packet that can be reliably transmitted over the channel during an allotted transmission opportunity.

Figure 9:
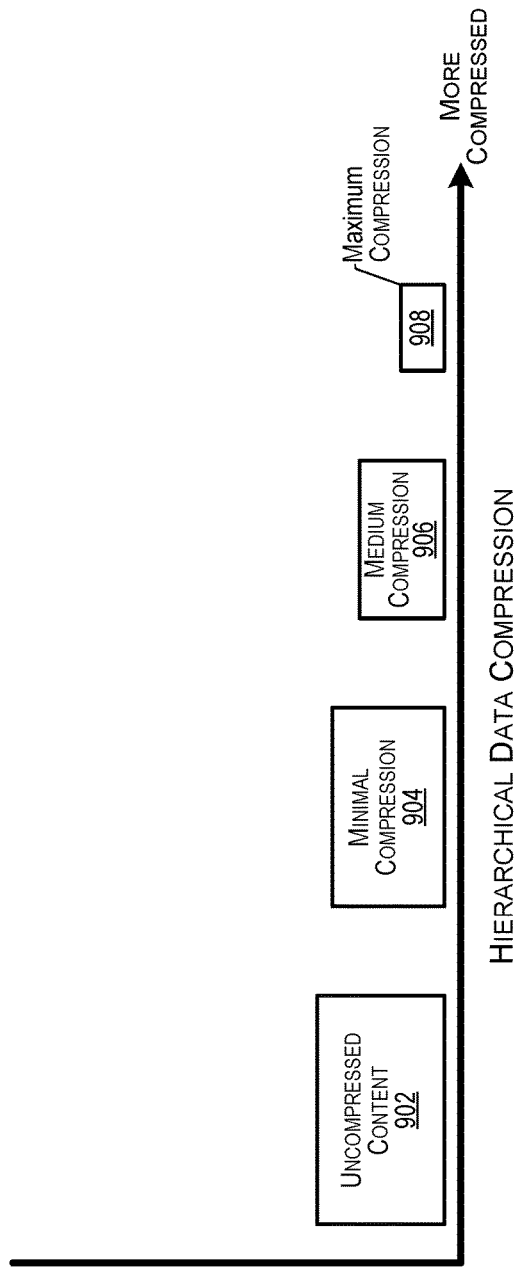
FIG. 9 illustrates an example of hierarchical data compression according to some implementations.

FIG. 9 illustrates an example 900 of hierarchical data compression according to some implementations. As mentioned in the example above, some implementations may include hierarchical data compression that enables different levels of compression to be performed on the application data. For instance, the compression module may list the details of the each possible compression level for a given type of data, and may include details such as level of compression, the resulting payload, whether the compression is lossless or lossy, and the extent of data lost in the case of lossy compression. FIG. 9 illustrates a graphical example of different compression levels, e.g., uncompressed 902, minimum compression 904, medium compression 906, and maximum compression 908. As mentioned above, for a given data type "k" and associated data $S_k$, the vector $\hat{S}_k$, shows all possible compression levels 0 to nk, with nk being the number of compression levels. For example nk=3 when the number of compression levels are high definition, standard definition, and low definition resolutions for video, as well as 0, i.e., uncompressed or raw video.

Figure 10:
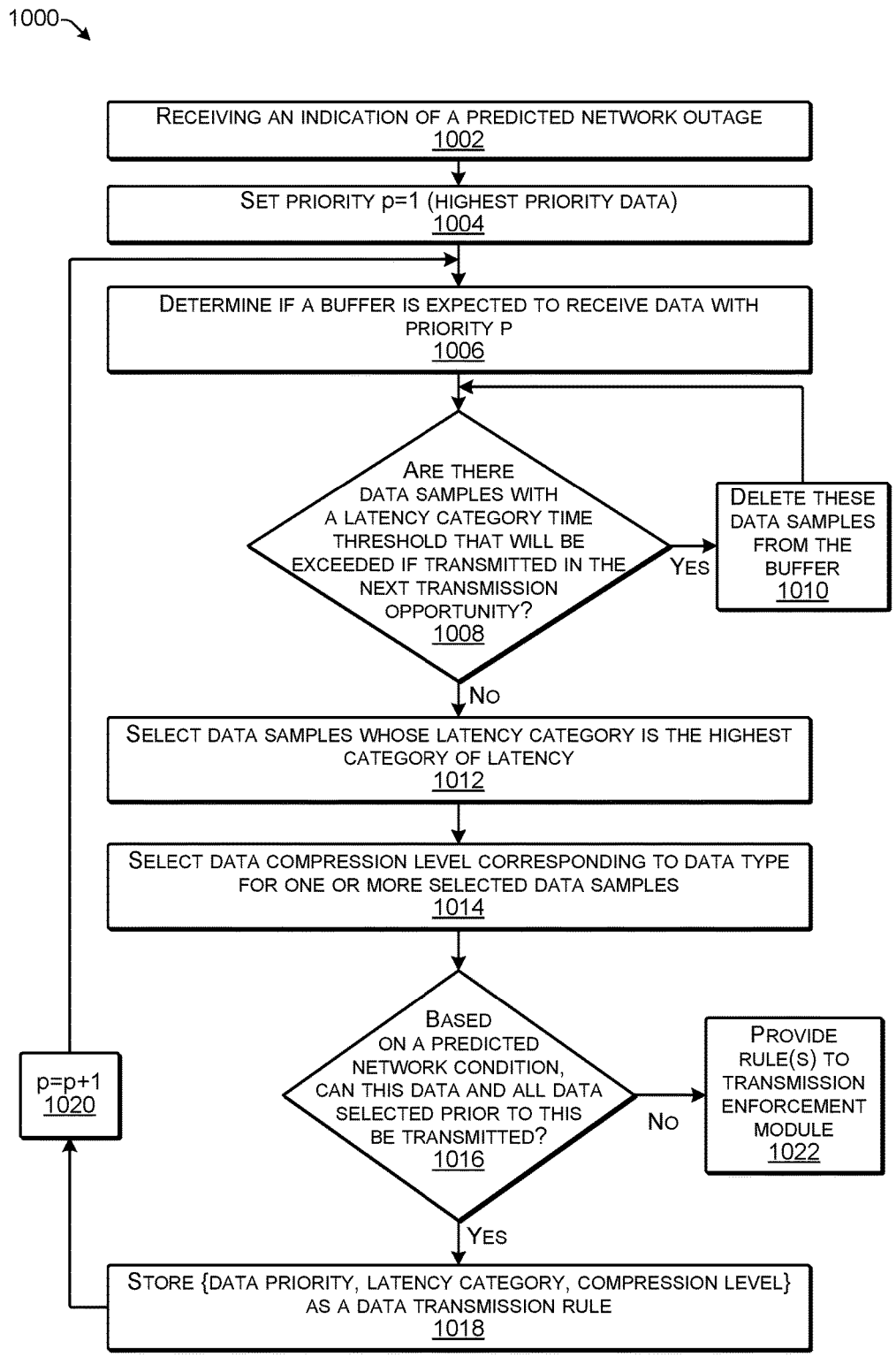
FIG. 10 is a flow diagram illustrating an example process for rule determination according to some implementations.
Figure 16:
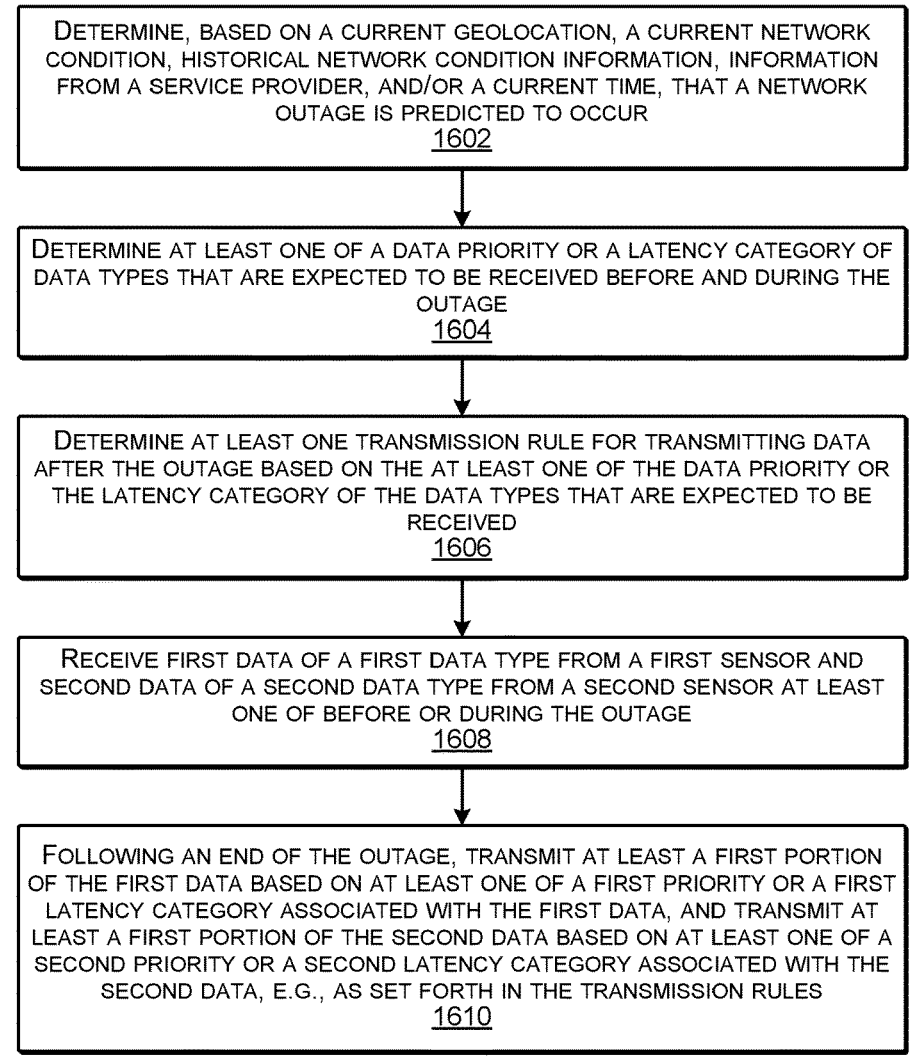
FIG. 16 is a flow diagram illustrating an example process for receiving and transmitting data according to some implementations.

FIGS. 10 and 16 are flow diagrams illustrating example processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks and systems described in the examples herein, although the processes may be implemented in a wide variety of other environments, frameworks and systems.

FIG. 10 is a flow diagram illustrating an example process 1000 for rule determination according to some implementations. In some examples, the process 1000 may be executed by the computing device 102 or other suitable computing device. As mentioned above, the data management application 122 may perform edge computing and other processing of received data for sending selected data over a network to the network computing device. The data management application 122 may perform resource allocation over multiple transmission instants, unlike a traditional optimizer that optimizes data at a given transmission instant. Thus, the data management application 122 may look at future data patterns and future transmission opportunities, and if the future data traffic is predicted to be light, then the data management application 122 may defer the transmission of some data samples to a future transmission opportunity. For instance, the data traffic pattern may be at least partially deterministic, and therefore, rules may be applied for determining which data to send at which times. FIG. 10 provides an example of some operations of the rule determination module 410 of the data management application 122. In other examples, some operations may be omitted, the order of the operations may be changed, and/or other operations may be included.

At 1002, the computing device may receive an indication of a predicted network outage. For example, as discussed above with respect to FIGS. 4 and 6, the rule determination phase may begin based on the network condition prediction module sending a predicted network condition to the rule determination module 410 indicating that there may be an outage in the near future.

At 1004, the computing device may set the priority p=1 (highest priority data). For example, the computing device may first examine the highest priority data to determine whether to select that data for sending to the network. In the examples herein, the data priority may range from "1" as the highest priority, with increasing integers corresponding to successively lower priorities. Of course, other relative values for data priority may be used in other examples.

At 1006, the computing device may determine if a buffer is expected to receive data with priority p during the outage. For example, the computing device may first consider the data that has the highest priority in any of the buffers that have received data or that will receive data from the data generators during the outage.

At 1008, the computing device may determine if there data samples or other data portions with a latency category time threshold that will be exceeded if transmitted during the next transmission opportunity. For instance, the computing device may determine a pattern of the data stored in each buffer and may determine the latency category of the data. The latency category may include a threshold time limit for the data to be transmitted to the network after receipt by the computing device. Thus, based on the latency category, the computing device may identify data samples or other data portions that that will be too old for transmission. For instance, even if these data samples were to be transmitted during the next transmission opportunity, the latency category time threshold (e.g., the threshold time for transmission) of these data samples would not be met. Consequently, if such data samples exist, the computing device may discard, overwrite, or otherwise delete these data samples from the buffer without transmission, as it would be pointless to transmit these data samples since the threshold time for the latency category has already been missed.

At 1010, if there data samples having a latency category that will not be met if transmitted during the next transmission opportunity, the computing device may discard these data samples from the buffer. For instance, as discussed above, even if these data samples were to be transmitted during the next transmission opportunity, the latency category of these data samples would not be met. Accordingly, these data samples may be removed from the respective buffer and discarded.

At 1012, from among the data samples that were not discarded at blocks 1008 and 1010, the computing device may select one or more data samples whose latency category are the highest latency category, e.g., critical and still able to be transmitted within the critical time threshold. Accordingly, from the data samples remaining in the one or more buffers, the computing device may select the data samples that have the highest latency category, e.g., shortest amount of time remaining for being transmitted. For example if there are multiple data samples that have been received from the same sensor or other same data generator, the data sample that arrived the earliest may have a more critical latency than the data samples that have arrived more recently from that data generator.

At 1014, the computing device may select a data compression level corresponding to the data type requirements for one or more selected data samples. For instance, the computing device may determine the levels of compression that are possible for the selected data sample based on the data priority information. As one example, the higher priority data may not be compressed, while relatively less important types of data having a lower priority may be compressed.

At 1016, based on predicted network state, the computing device may determine whether the currently selected data and all data that may have been selected already are able to be transmitted. For instance, if compression is permitted, the computing device may determine, if the data is compressed, whether the network is able to reliability transmit this data along with any other higher priority data already selected. As one example, the computing device may base this determination on an estimate of the network capacity (e.g., in terms of bits per second), which may be obtained from the predicted network condition information 424 discussed above with respect to FIG. 4. For example, suppose that the network capacity is 1 MB of data for reliable transmission in an upcoming transmission opportunity. Based on this, the sum of all the data selected for transmission may be less than 1 MB. A pictorial view of network capacity had been provided in FIG. 8.

At 1018, the computing device may store the determined information as a rule e.g., {data priority, latency category, and compression level}. For instance, if the network capacity is sufficient, then the currently considered data samples that are able be transmitted and their compression level, may be added as a rule to be entered in rules data structure. An example rules data structure for maintaining rules is illustrated in FIG. 11.

At 1020, the computing device may increment priority p, e.g., p=p+1 to move on to the data type(s) with the next highest priority and may repeat the process until the result at 1016 is "no".

At 1022, the computing device may provide the data transmission rule(s) to the transmission enforcement module for transmission of the data according to the rule(s). An example is discussed below with respect to FIG. 12.

Figure 11:
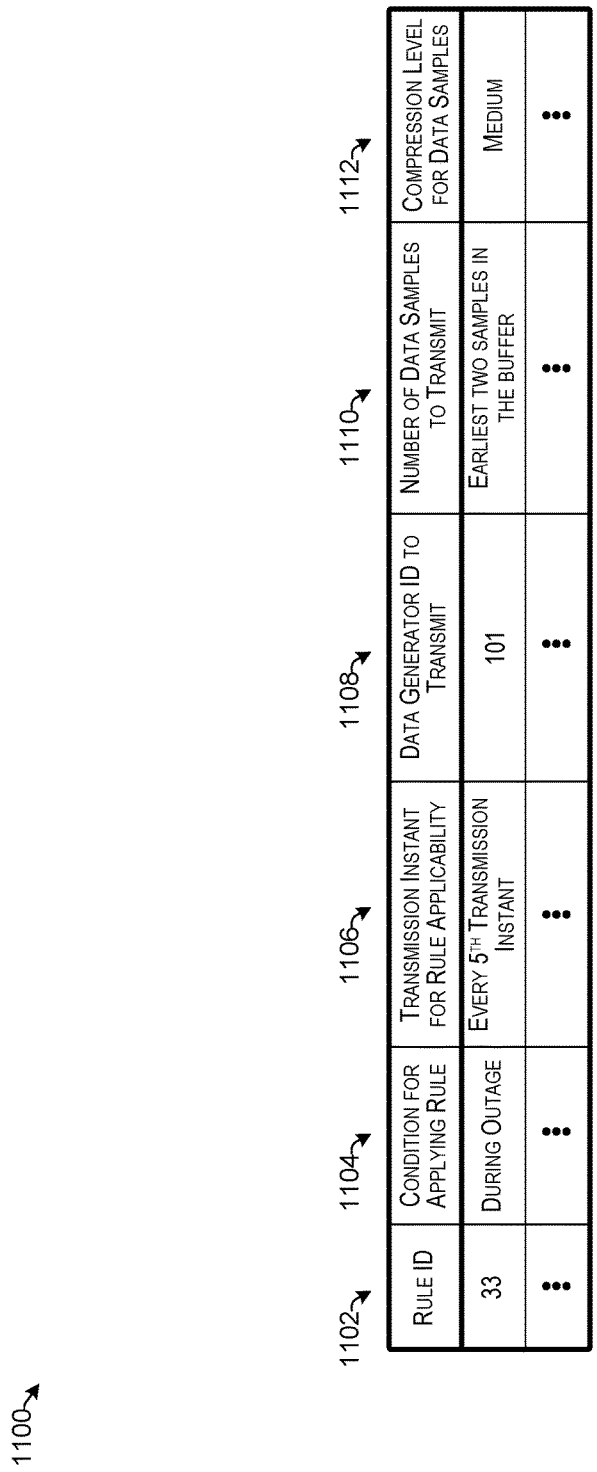
FIG. 11 illustrates an example rule data structure according to some implementations.

FIG. 11 illustrates an example rules data structure 1100 according to some implementations. The rules data structure 1100 may include one or more rules for data transmission, which may be generated by the rule determination module 410, as discussed above, e.g., with respect to FIGS. 4 and 10. In this example, the rules data structure 1100 may include a rule identifier (ID) 1102, condition for applying the rule 1104, a transmission instant for rule applicability 1106, a supported data generator ID to transmit 1108, a number of data samples to transmit 1110, and a compression level for data samples 1112.

For instance, the rule ID 1102 may be assigned to make the rule distinguishable from other rules. Furthermore, the condition for applying the rule 1104 may indicate whether the rule is to be applied during a network outage or during normal network conditions. The transmission instant for rule applicability 1106 may indicate during which transmission instants data may be transmitted according to the rule. The data generator ID to transmit 1108 may indicate an identifier of the data generated that identifies the data type of the transmitted data to the network computing device that receives the data transmission. The number of data samples to transmit 1110 may indicate the number of samples from a particular buffer to transmit. In addition, the compression level for data samples 1112 may indicate the compression level for the data that will be transmitted.

Figure 12:
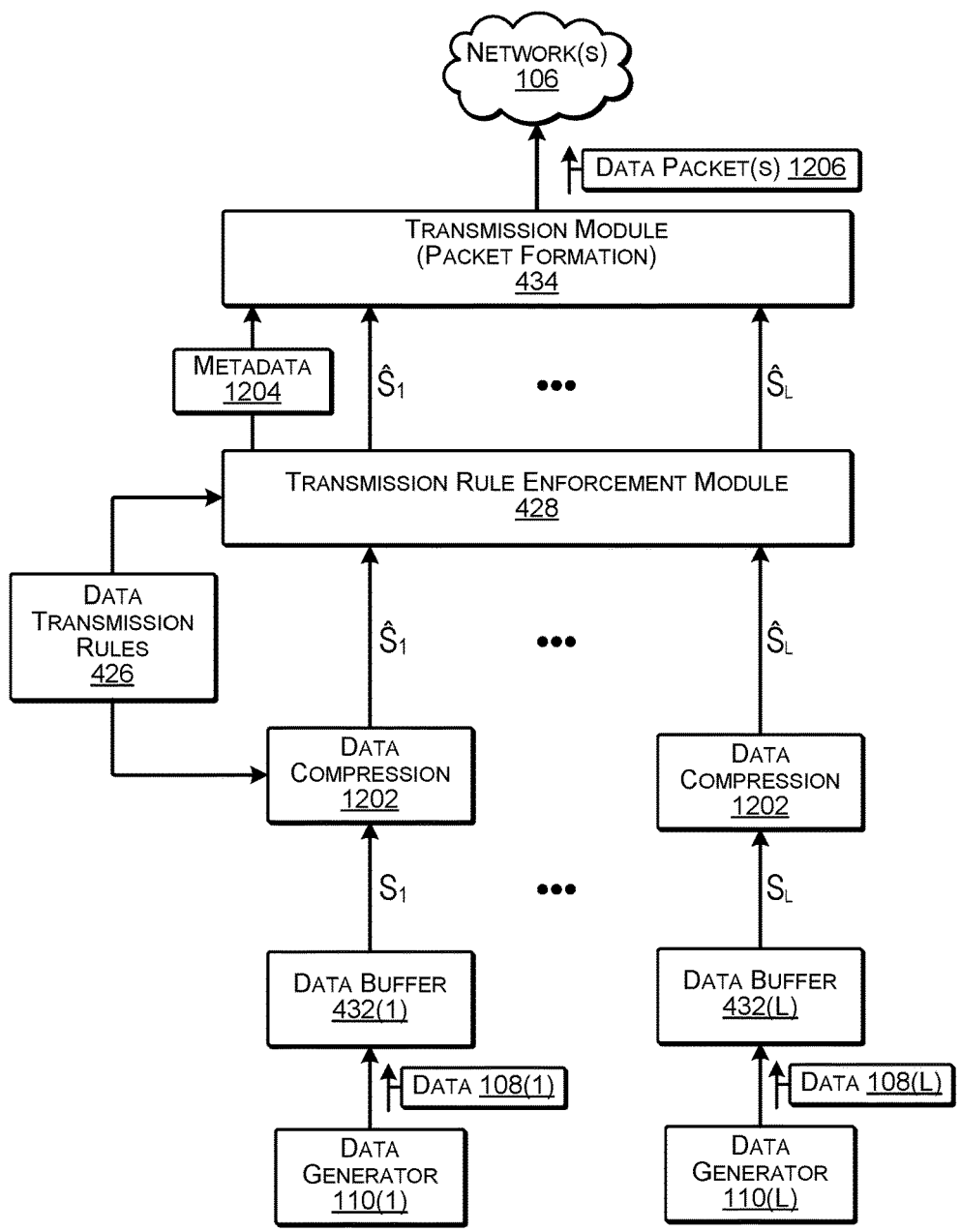
FIG. 12 illustrates an example of operations performed by the data transmission enforcement module according to some implementations.

FIG. 12 illustrates an example 1200 of operations performed by the data transmission enforcement module 428 according to some implementations. In this example, the data generators 110 may provide data 108 to respective data buffers 432. For example, there may be a respective data buffer for each type of data, where each type of data corresponds to data from a different data generator. Thus, a first data generator 110(1) may provide a first type of data 108(1) to a first data buffer 432(1), an Lth data generator 110(L) may provide an Lth type of data 108(L) to an Lth data buffer 432(L), and so forth. As the data is ingested and stored in the data buffers 432, the transmission rule enforcement module 428 may refer to the data transmission rules 426 to determine data to select from the data buffers 432 for transmission to the network 106.

In some examples, as indicated at 1202, based on the data transmission rules 426, the transmission rule enforcement module 428 may compress one or more of the selected data samples $S_1$-$S_L$ for transmission during a given transmission instant. As mentioned above, in some cases one or more of the data samples $S_1$-$S_L$ might not be compressed, such as in the case of higher priority data.

The transmission rule enforcement module 428 may provide the selected data samples $S_1$-$S_L$ and corresponding metadata 1204 to the transmission module 434, which may form one or more data transmission packets. For instance, the data packets 1206 may include the compressed (or uncompressed in some cases) data samples $S_1$-$S_L$. In addition, the data packets 1206 may include the metadata 1204, which may include information about which data from which data generators are included in the data packets 1206, information about compression levels for the data in the data packets 1206, and so forth, which may be used by the network computing device as control information for decoding the data packets when received. Accordingly, after the one or more data packets 1206 have been formed, the transmission module may cause transmission of these packets 1206 over the network as a data transmission that may be received by the network computing device 104, as discussed above with respect to FIG. 1.

Figure 13:
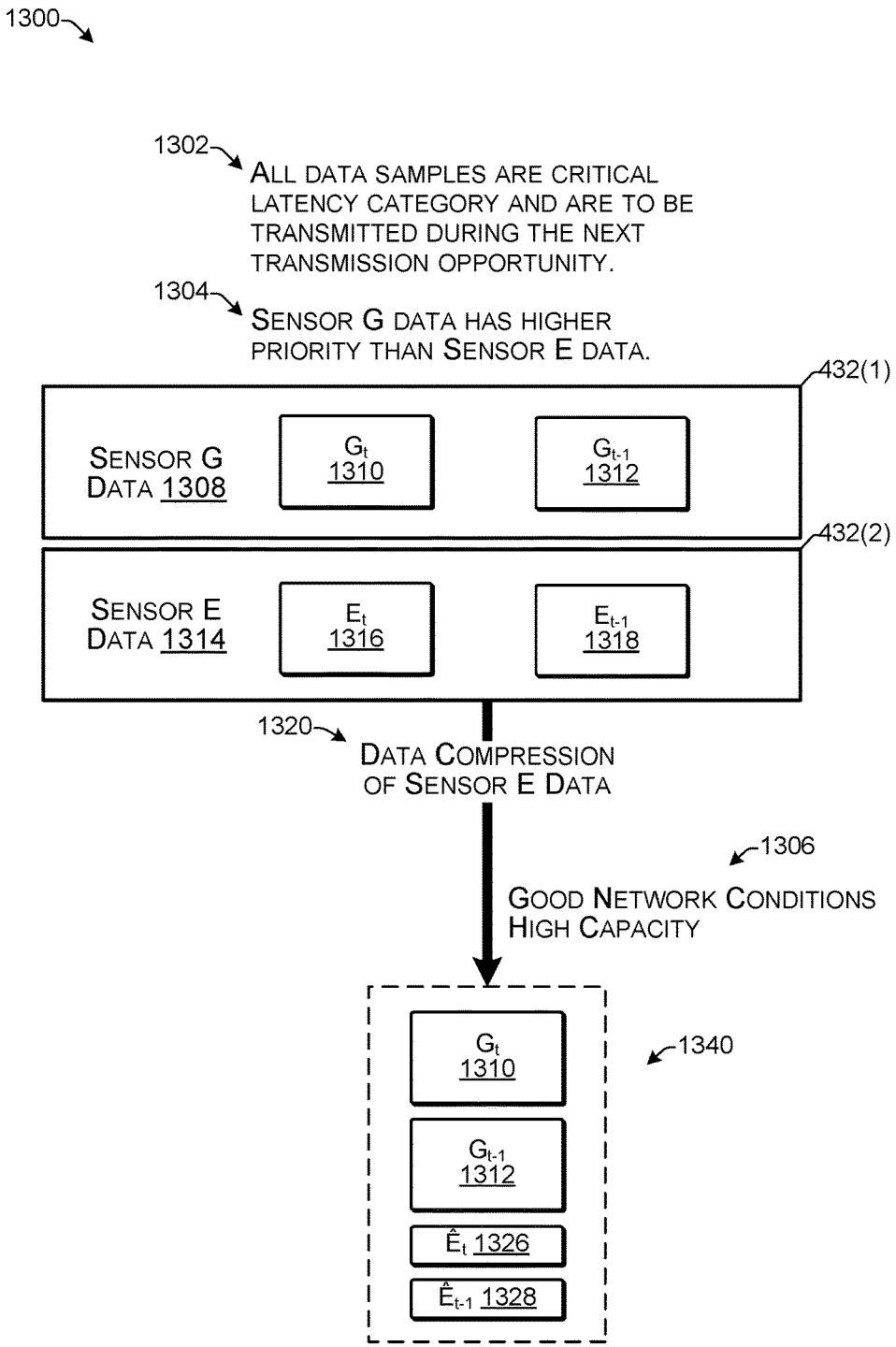
FIG. 13 illustrates an example of selecting and preparing data for transmission according to some implementations.

FIG. 13 illustrates an example 1300 of selecting and preparing data for transmission according to some implementations. In the illustrated example, suppose that the data generators include two sensors, a first sensor G and a second sensor E. In this example, suppose that there are two data samples per sensor in respective data buffers 432(1) and 432(2). As indicated at 1302, suppose that the data samples all have a critical latency category and are to be transmitted during the next transmission opportunity. Furthermore, as indicated at 1304, suppose that the data from sensor G has a higher priority than the data from sensor E. Additionally, as indicated at 1306, suppose that the network conditions are good and, therefore, the network capacity is high, but that it may not be high enough for all the four samples to be transmitted uncompressed. Thus, the data transmission rule(s) may recommend that data from sensor E is to be compressed.

Data buffer 432(1) includes sensor G data 1308, which in this case is a most recent data sample 1310 $G_t$ and an older data sample 1312 $G_{t-1}$. Furthermore, data buffer 432(2) includes sensor E data 1314, which in this case is a most recent data sample 1316 $E_t$ and an older data sample 1318 $E_{t-1}$. As indicated at 1320, based on the amount of data, the network conditions 1306, and the data transmission rule(s), the sensor E data 1314 is compressed to obtain compressed sensor E data 1326 $E_t$ and 1328 $E_{t-1}$. Additionally, as indicated at 1340, the sensor G data and compressed sensor E data may be packetized for transmission.

Figure 14:
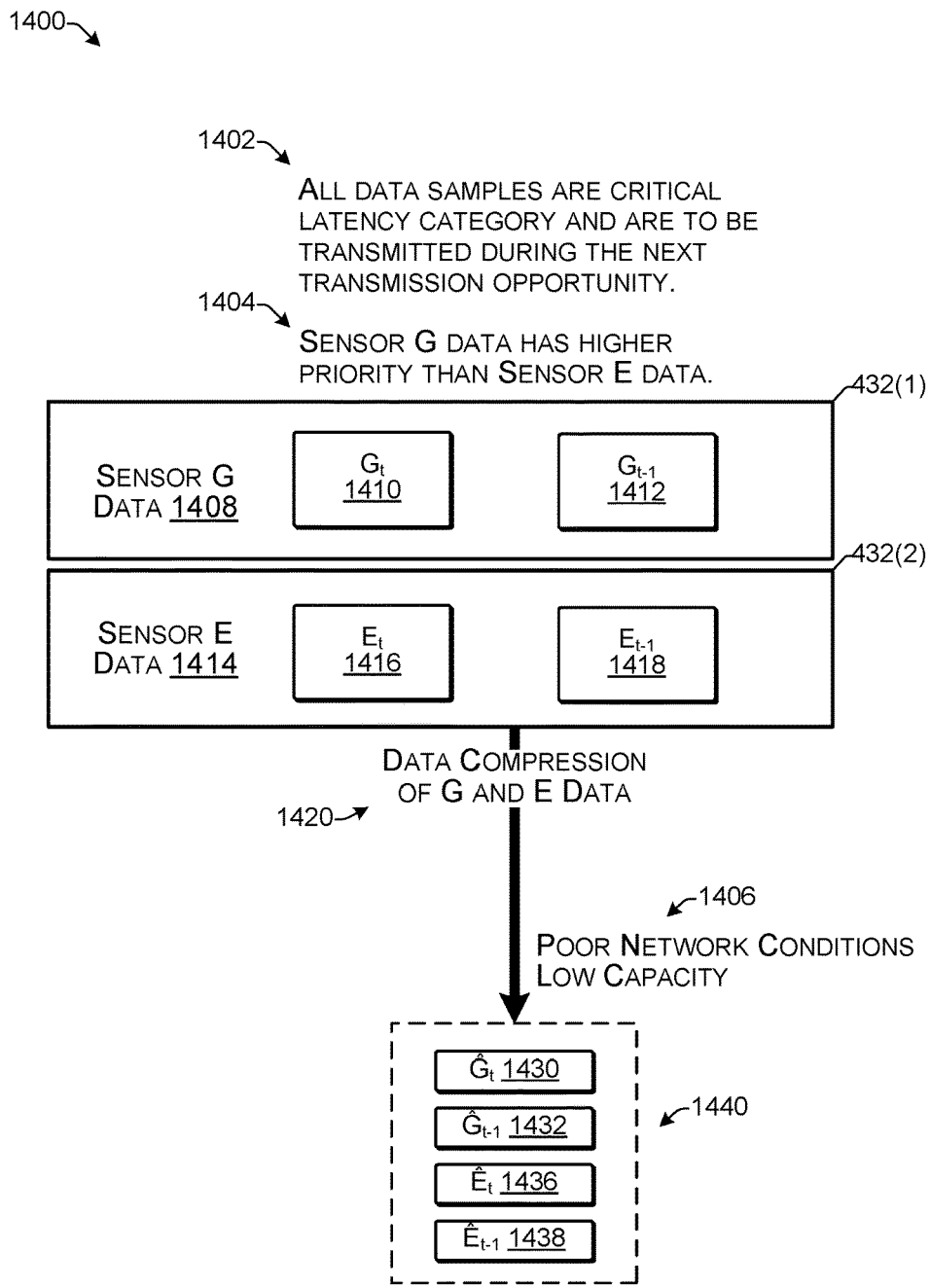
FIG. 14 illustrates an example of selecting and preparing data for transmission according to some implementations.

FIG. 14 illustrates an example 1400 of selecting and preparing data for transmission according to some implementations. In this example, suppose that there are two data samples per sensor in respective data buffers 432(1) and 432(2). As indicated at 1402, suppose that the data samples all have a critical latency category and are to be transmitted during the next transmission opportunity. Furthermore, as indicated at 1404, suppose that the data from sensor G has a higher priority than the data from sensor E. Additionally, as indicated at 1406, suppose that the network conditions are poor and, therefore, the network capacity is low. Consequently, in this case, the data transmission rules may recommend that data from both sensor G and sensor E is to be compressed even though the data from sensor G has a higher priority than the data from sensor E.

Data buffer 432(1) includes sensor G data 1408, which in this case is a most recent data sample 1410 $G_t$ and an older data sample 1412 $G_{t-1}$. Furthermore, data buffer 432(2) includes sensor E data 1414, which in this case is a most recent data sample 1416 $E_t$ and an older data sample 1418 $E_{t-1}$. As indicated at 1420, based on the amount of data, the network conditions 1406, and the data transmission rules, the sensor G data 1408 and the sensor E data 1414 is compressed to obtain compressed sensor G data 1430 Gt and 1432 $G_{t-1}$ and compressed sensor E data 1436 $E_t$ and 1438 $E_{t-1}$. Additionally, as indicated at 1442, the compressed sensor G data and compressed sensor E data may be packetized for transmission.

Figure 15:
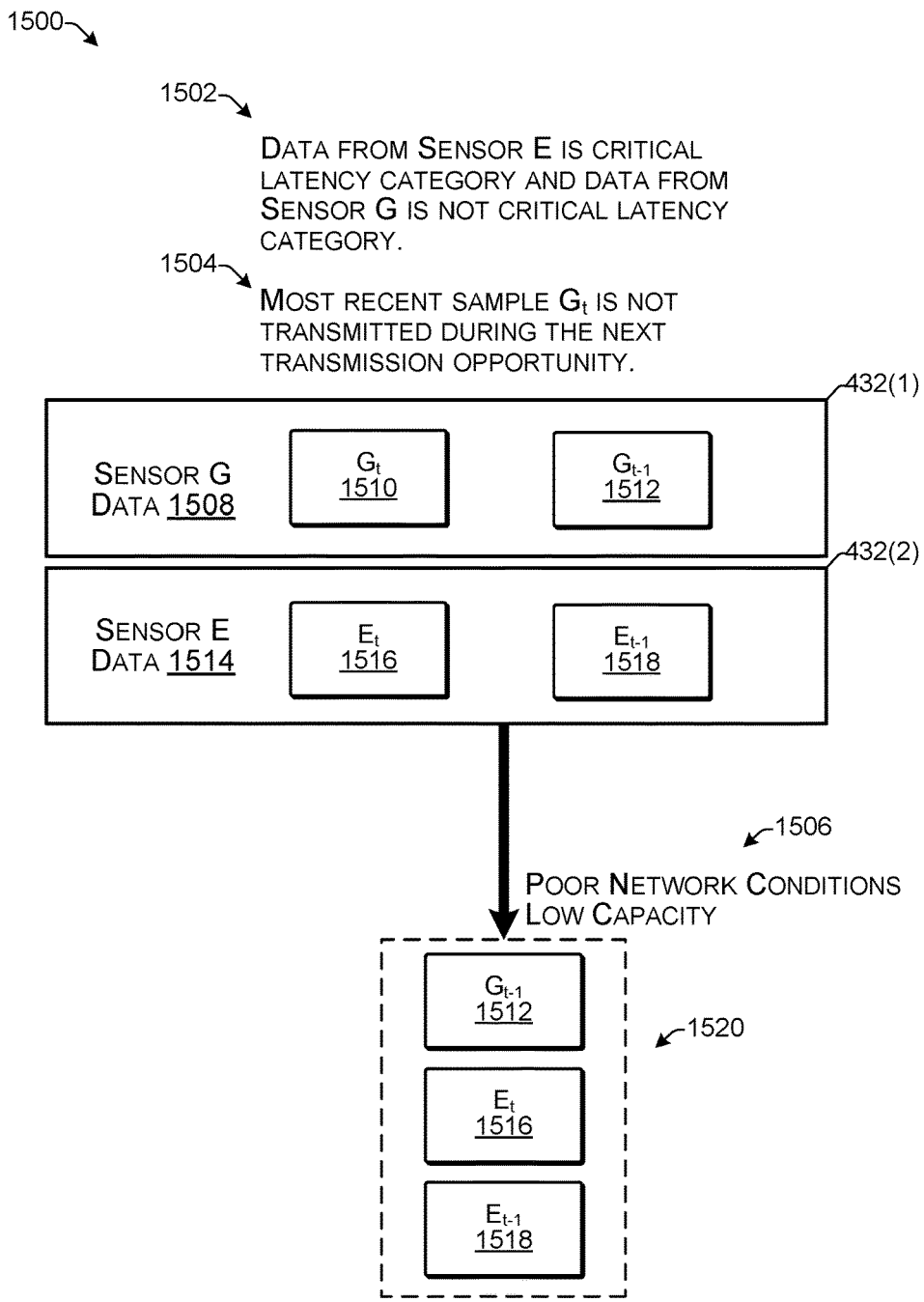
FIG. 15 illustrates an example of selecting and preparing data for transmission according to some implementations.

FIG. 15 illustrates an example 1500 of selecting and preparing data for transmission according to some implementations. In this example, suppose that there are two data samples per sensor in respective data buffers 432(1) and 432(2). As indicated at 1502, suppose that the data samples from sensor E have a critical latency category and data samples from sensor G are categorized as not critical latency category. Furthermore, as indicated at 1504, suppose that because the latency category is not critical, the most recent data sample from sensor G does not need to be transmitted during the next transmission opportunity. For example, the earlier data sample may be transmitted to fulfil the requirement of the latency category. Additionally, as indicated at 1506, suppose that the network conditions are poor and, therefore, the capacity is low. Furthermore, the priority of the sensor G data 1508 may be higher than the priority of the sensor E data 1514.

Data buffer 432(1) includes sensor G data 1508, which in this case is a most recent data sample 1510 $G_t$ and an older data sample 1512 $G_{t-1}$. Furthermore, data buffer 432(2) includes sensor E data 1514, which in this case is a most recent data sample 1516 $E_t$ and an older data sample 1518 $E_{t-1}$. However, since the latency category does not require that the most recent data sample 1510 $G_t$ be transmitted, the data transmission rules may recommend no compression or minimal compression, and that one data sample from sensor G and both data samples from sensor E be transmitted. Accordingly, as indicated at 1520, based on the amount of data, the network conditions 1506, and the data transmission rules, data sample 1512 $G_{t-1}$, data sample 1516 $E_t$, and data sample 1518 $E_{t-1}$ may be packetized for transmission without compression or with minimal compression.

FIG. 16 is a flow diagram illustrating an example process 1600 for receiving and transmitting data according to some implementations. In some examples, the process 1600 may be executed by the computing device 102 or other suitable computing device.

At 1602, the computing device may determine, based on a current geolocation, a current network condition, historical network condition information, information from a service provider, and/or a current time, that a network outage is predicted to occur. For example, as discussed above with respect to FIG. 4, the network condition prediction module may consider a variety of information for determining a predicted network condition.

At 1604, the computing device may determine at least one of a data priority or a latency category of data types that are expected to be received before and during the outage. For instance, the computing device may know which data types will be received during the outage, and may determine the data priority, latency category, compression information, and so forth from the corresponding data profile.

At 1606, the computing device may determine at least one data transmission rule for transmitting data after the outage based on the at least one of the data priority or the latency category of the data types that are expected to be received. Examples of determining data transmission rules are discussed above with respect to FIGS. 4 and 10, and may be determined based on expected data, the latency categories, data priorities, and compression information.

At 1608, the computing device may receive first data of a first data type from a first sensor and second data of a second data type from a second sensor at least one of before or during the outage. For example, each data type may be stored in a separate data buffer, respectively, and may have a separate data profile associated therewith that indicates a periodicity of data generation, a size of the data, a priority of the data and/or a latency category of the data.

At 1610, following an end of the outage, the computing device may transmit at least a first portion of the first data based on at least one of a first priority or a first latency category associated with the first data, and transmit at least a first portion of the second data based on at least one of a second priority or a second latency category associated with the second data, e.g., as set forth in the at least one data transmission rule. Additionally, in some examples, the computing device may determine, based on the first latency category associated with the first data that a time threshold corresponding to the first latency category of a second portion of the first data will be exceeded if transmitted during the next transmission opportunity. Based on this, the computing device may delete or otherwise omit transmission of the second portion of the first data from the first data transmitted to the network.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as program modules stored on computer-readable media, and executed by the processor(s) herein. Generally, program modules include routines, programs, objects, components, data structures, executable code, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A system comprising:
   one or more processors; and
   one or more non-transitory computer-readable media maintaining executable instructions, which, when executed by the one or more processors, program the one or more processors to perform operations comprising:
   determining a prediction of a network outage of a network;
   determining a priority of one or more data types expected to be received during the network outage;
   determining a latency category of the one or more data types expected to be received during the network outage;
   storing a data transmission rule for the one or more data types at least partially based on the priority and the latency category;
   receiving, from one or more data generators, during the network outage, data for transmission to the network;
   transmitting at least some of the received data to the network at least partially based on the data transmission rule;
   determining a latency category of the data received during the network outage;
   determining that a time threshold corresponding to the latency category of a first portion of the data will be exceeded if the first portion is transmitted during a next transmission opportunity; and
   omitting the first portion of the data from the data transmitted to the network.

2. The system as recited in claim 1, wherein the operation of transmitting at least some of the received data to the network at least partially based on the data transmission rule comprises:
   during the network outage, selecting a plurality of data portions of the received data for transmission based on the data transmission rule; and
   transmitting the selected data portions to the network during a first transmission opportunity following an end of the network outage.

3. The system as recited in claim 2, wherein the operation of selecting the plurality of data portions for transmission based on the data transmission rule comprises:
   receiving first data of a first data type from a first data generator for storage in a first buffer;
   receiving second data of a second data type from a second data generator for storage in a second buffer;
   determining that the first data type has a higher priority than the second data type; and
   selecting for transmission a first portion of the first data and a first portion of the second data, wherein the first portion of the first data is uncompressed and the first portion of the second data is compressed prior to transmission based on the priority.

4. The system as recited in claim 1, further comprising:
   selecting one or more expected data portions whose latency category is a highest category of latency for a highest level of priority;
   determining one or more data compression levels for the selected expected data portions; and
   prior to storing the data transmission rule for the one or more data types, determining that, based on a predicted network condition following the outage, the selected data portions are able to be transmitted.

5. The system as recited in claim 1, wherein:
   the network includes a wireless network; and
   determining the prediction of the network outage is based at least in part on determining, based on location information, that the one or more processors are approaching a geographic region with limited wireless communication coverage.

6. The system as recited in claim 1, wherein the one or more data generators include one or more sensors that provide the data as data samples provided at regular time periods and in regular data quantities.

7. A method comprising:
   determining, by a processor, at least partially based on a current geolocation, a prediction of a network outage of a network;
   determining a priority of one or more data types expected to be received during the network outage;
   determining a latency category of the one or more data types expected to be received during the network outage;
   storing a data transmission rule for the one or more data types at least partially based on the priority and the latency category;
   receiving, from one or more data generators, during the network outage, data for transmission to the network;

transmitting at least some of the received data to the network at least partially based on the data transmission rule;

selecting one or more expected data portions whose latency category is a highest category of latency for a highest level of priority;

determining one or more data compression levels for the selected expected data portions; and prior to storing the data transmission rule for the one or more data types, determining that, based on a predicted network condition following the outage, the selected data portions are able to be transmitted.

8. The method as recited in claim 7, wherein transmitting at least some of the received data to the network at least partially based on the data transmission rule further comprises:

during the network outage, selecting a plurality of data portions of the received data for transmission based on the data transmission rule; and transmitting the selected data portions to the network during a first transmission opportunity following an end of the network outage.

9. The method as recited in claim 8, wherein selecting the plurality of data portions for transmission based on the data transmission rule comprises:

receiving first data of a first data type from a first data generator for storage in a first buffer;

receiving second data of a second data type from a second data generator for storage in a second buffer;

determining that the first data type has a higher priority than the second data type; and selecting for transmission a first portion of the first data and a first portion of the second data, wherein the first portion of the first data is uncompressed and the first portion of the second data is compressed prior to transmission based on the priority.

10. The method as recited in claim 7, further comprising:

determining a latency category of the data received during the network outage;

determining that a time threshold corresponding to the latency category of a first portion of the data will be exceeded if the first portion is transmitted during a next transmission opportunity; and omitting the first portion of the data from the data transmitted to the network.

11. The method as recited in claim 7, wherein:

the network includes a wireless network, and determining the prediction of the network outage includes determining the prediction of the network outage based at least in part on determining, based on geolocation information, that the one or more processors are approaching a geographic region with limited wireless communication coverage.

12. The method as recited in claim 11, further comprising:

determining that the geographic region has limited wireless communication coverage based on at least one of:

historical network condition information collected by the one or more processors in the past; or an indication of geographic communication coverage received from a cellular service provider.

13. A system comprising:

one or more processors; and one or more non-transitory computer-readable media maintaining executable instructions, which, when executed by the one or more processors, program the one or more processors to:

determine, based on historical network condition information and an indication of a current geolocation of the one or more processors, a prediction of an outage of a network;

receive first data of a first data type from a first sensor, and second data of a second data type from a second sensor at least one of before or during the outage; and following an end of the outage, transmit at least a first portion of the first data based on at least one of a first priority or a first latency category associated with the first data, and transmit at least a first portion of the second data based on at least one of a second priority or a second latency category associated with the second data.

14. The system as recited in claim 13, wherein the one or more processors are further programmed to, at least partially based on the prediction of the outage, determine at least one of a data priority or a latency category of data types that are expected to be received before and during the outage.

15. The system as recited in claim 14, wherein the one or more processors are further programmed to:

determine at least one transmission rule for transmitting data after the outage based on the at least one of the data priority or the latency category of the data types that are expected to be received, wherein transmitting at least the first portion of the first data and at least the first portion of the second data is based on the at least one transmission rule.

16. The system as recited in claim 13, wherein the one or more processors are further programmed to:

determine, based at least in part on the first latency category associated with the first data, that a time threshold corresponding to the first latency category of a second portion of the first data will be exceeded if transmitted during the next transmission opportunity; and omit the second portion of the first data from the first data transmitted to the network.

17. The system as recited in claim 13, wherein:

the first data of the first data type is stored in a first data buffer associated with a first data profile, the second data of the second data type is stored in a second data buffer associated with a second data profile, and each of the first data profile and the second data profile may indicate at least one of: a periodicity of data generation, a data size, a data priority, or a respective latency category.

18. The system as recited in claim 13, wherein the network is a wireless network, and the prediction of the outage of the network is determined at least partially based on determining that a geographic region that the one or more processors are approaching has limited wireless communication coverage based on at least one of:

historical network condition information collected by the one or more processors in the past; or an indication of geographic communication coverage received from a cellular service provider.

* * * * *